(12) United States Patent
Ichimaru et al.

(10) Patent No.: US 6,405,413 B2
(45) Date of Patent: Jun. 18, 2002

(54) ATTACHING CLIP

(75) Inventors: Takahide Ichimaru; Tsuyoshi Hamaguchi, both of Sagamihara (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 09/858,897

(22) Filed: May 17, 2001

(30) Foreign Application Priority Data

May 22, 2000 (JP) ........................................ 2000-149707

(51) Int. Cl.[7] ................................................. F16B 19/00
(52) U.S. Cl. ........................... 24/297; 24/453; 411/510; 411/512
(58) Field of Search ........................ 411/508–510, 512; 24/297, 453, 289, 293–295; 174/138 D

(56) References Cited

U.S. PATENT DOCUMENTS

| 4,402,118 A | * | 9/1983 | Benedetti |
| 4,644,612 A | * | 2/1987 | Osterland |
| 4,708,895 A | * | 11/1987 | Mizusawa |
| 4,865,505 A | * | 9/1989 | Okada |
| 5,533,237 A | * | 7/1996 | Higgins |
| 5,966,782 A | * | 10/1999 | Ishihara et al. |
| 6,074,150 A | * | 6/2000 | Shinozaki et al. |
| 6,101,686 A | * | 8/2000 | Velthoven et al. |

* cited by examiner

*Primary Examiner*—James R. Brittain
(74) *Attorney, Agent, or Firm*—Kanesaka & Takeuchi

(57) ABSTRACT

A clip is attached to an insertion part of an object and inserted into an attachment hole formed in an object receiving attachment. The clip is formed of a pair of clamping plates facing each other for receiving therebetween the insertion part of the object and having elasticity for expanding outward. The clamping plates have a plurality of teeth with tips formed on inner surfaces. The tips form a multiple stage pattern across a direction of insertion into the attachment hole to be pressed to the insertion part. Also, coupling arms are provided outside the clamping plates. The coupling arms are coupled into the attachment hole by elasticity at a final position of insertion into the attachment hole after being elastically bent inward upon insertion of the insertion part of the object into the attachment hole.

11 Claims, 16 Drawing Sheets

ATTACHING CLIP

BACKGROUND OF THE INVENTION AND RELATED ART STATEMENT

The invention relates to an improvement of a clip that is used for attaching an object to an object receiving attachment with one touch, wherein the clip is fixed around an insertion part of the object being attached and is inserted into an attachment hole opened in the object receiving attachment to be coupled to the attachment hole.

There is a clip having a pair of clamping plates 300 that receives and holds therebetween a receiving plate part 102 of an insertion part 101 formed in an object 100 being attached, and coupling arms 301 formed outside this pair of the clamping plates 300 and coupled with an attachment hole 201 formed in an object receiving attachment 200 pursuant to insertion of the insertion part 101 into the attachment hole 201 (FIG. 16 through FIG. 18).

The pair of clamping plates 300 and the coupling arms 301 in such a clip are constituted so as to be capable of elastic deformation. Also, the receiving plate part 102 is disposed between the inner surfaces of the pair of clamping plates 300 while elastically bending the clamping plates 300 outwardly by inserting the receiving plate part 102 between such pair of the clamping plates 300. In the state in which the clamping plates 300 are fixed around the receiving plate part 102 in this manner, the clamp plates 300 and the receiving plate part 102 are inserted into the attachment hole 201, so that after the coupling arms 301 are once bent inwardly, the coupling arms 301 returns at the far ends to cause the coupling arms 301 to be coupled to the hole edge parts on the far end of insertion, whereby the object 100 being attached is attached to the object receiving attachment 200 with one touch.

Also, in such a clip, the receiving plate part 102 abuts against the clamping plates 300 so as to once cause the pair of clamping plates 300 to be bent outward pursuant to the receiving of the receiving plate 102 on the mutually facing surfaces of the pair of the clamping plates 300, and receives projections 302 in a coupling hole 109 formed in the receiving plate part 102 at a specified position by the elasticity of the bent out clamping plates 300. When the side of the object 100 being attached is pulled so as to pull the insertion part 101 of the object 100 out from the attachment hole 201, from the state in which the coupling arms 301 are coupled to the attachment hole 201, it is pulled out from the attachment hole 201 in the condition of being fixed around the insertion part 101 without the clip being left on the side of the attachment hole 201, such that problems are not caused such as in re-attaching of the object 100.

However, in such clip of the past, because the receiving plate part 102 is made so as to fix around the inner surfaces of the pair of clamping plates 300, in cases such as there is unevenness, and the like, on the plate surface of such receiving plate part 102, there are many cases that the inner surfaces can not always be properly pressed against the plate surfaces in all locations across the direction of insertion of such receiving plate part 102, and further improvement has been desired in order to make the state of fixing of the clip to such receiving plate part 102 higher.

Also, such clip of the past necessarily requires the opening of a coupling hole 109 on the side of the receiving plate part 102 such that the clip does not remain in the attachment hole 201 when removing the object 100 being attached, which was once attached to the object receiving attachment 200, from the object receiving attachment 200.

Therefore, the main object of this invention is to provide a clip that can cause clamping force to act properly on the receiving plate part, which constitutes the insertion part provided on the object being attached, in all locations across the direction of insertion of the insertion part even when there is unevenness, and the like, on the plate surfaces of the receiving plate part, and can assuredly be pulled out from the attachment hole in the object receiving attachment together with the insertion part during removal of the object being attached, in which the insertion part is pulled out from the attachment hole, even without applying special processing to the side of the insertion part.

SUMMARY OF THE INVENTION

In order to solve such problems, in the first aspect of the invention, the clip comprises: a pair of clamping plates that receive between themselves a receiving plate part, which is a constituent of an insertion part of an object being attached and is inserted into an attachment hole opened in an object receiving attachment, while elastically expanding outward, to be fixed around the receiving plate part; and coupling arms provided on the outside of this pair of clamping plates. The coupling arms are coupled into the attachment hole by elasticity at a final position of insertion into the attachment hole after once having been elastically bent inward pursuant to insertion of the insertion part of the object being attached into the attachment hole of the object receiving attachment. A plurality of teeth, the tips of which are pressed to the received receiving plate part, is respectively provided on the mutually facing sides of the pair of clamping plates so as to form a multiple stage pattern across the direction of insertion into the attachment hole.

By such constitution, by inserting the receiving plate part between the pair of clamping plates, the receiving plate part can be clamped by the clamping plates, while the pair of clamping plates elastically expand outward, such that the plurality of teeth provided on the pair of clamping plates are respectively pressed against the plate surfaces of the receiving plate part being inserted, and the clip can be fixed to the receiving plate part by this clamping.

Also, because such plurality of teeth is provided so as to form a multiple stage pattern across the direction of insertion of the insertion part into the attachment hole, that is, in the direction of entry of the receiving plate, the teeth can be pressed against the receiving plate part by the springing or elastic force of the clamping plates in a plurality of locations across the direction of entry of the receiving plate part from both surface sides of the receiving plate part. Thus, the state of fixing of the receiving plate part between such pair of clamping plates can be maintained with stability.

Also, because the springing force of the clamping plates acts on the receiving plate part at points with the tips of the plurality of teeth, the receiving plate part can be properly fixed around the pair of clamping plates even when there is some unevenness on the plate surfaces of such receiving plate part.

Also, by attaching the clip to the insertion part of the object being attached by inserting the receiving plate part between the clamping plates in this manner and then inserting this insertion part into the attachment hole of the object receiving attachment, the coupling arms can be coupled to the hole edge part of the attachment hole by elasticity at the final position of insertion of this insertion part into the attachment hole after once elastically bending inward. Thus, the object being attached can be attached to the object receiving attachment via the clip with one touch.

Also, in the second aspect of the invention, the teeth provided on the clamping plates, which are a constituent of the clip described in the first aspect, have elasticity.

By such constitution, the elastic force of such teeth can be made to further act on the receiving plate part which was inserted between the pair of clamping plates, and the state of fixing between the receiving plate part and the clip can be further improved.

Also, in the invention described in the third aspect, it is made such that the pair of clamping plates having received the receiving plate part, which is a constituent of the insertion part in the clip described in the first aspect, is pressed at free end parts from outside by the coupling arms which are pressed against the hole edge part of the attachment hole and are bent inward when force in the direction of pulling out the insertion part from the attachment hole of the object receiving attachment is applied.

By such constitution, when the object being attached and the object receiving attachment which once were attached together via the clip are separated by pulling the object being attached with a force great enough to pull out the insertion part from the attachment hole, the expansion of the pair of clamping plates can be checked or prevented by the coupling arm. Thus, the clip can be pulled out from the attachment hole together with the insertion part in a state being fixed to the receiving plate part which is a constituent of the insertion part without being left on the side of the object receiving attachment, that is, in the attachment hole, and problems are not caused such as in re-attaching the object being attached to the object receiving attachment.

Also, in the fourth aspect of the invention, in the clip of the first aspect, the clip is further constituted such that free end parts of the pair of clamping plates having received the receiving plate part which is a constituent of the insertion part is positioned between a pair of checking walls that is provided on a protruding base part of the insertion part of the object being attached such that expanding outward is prevented by abutment when a force in the direction of pulling out the insertion part from the attachment hole of the object receiving attachment is applied.

By such constitution, when the object being attached and the object receiving attachment which once were attached together via the clip are separated by pulling the object being attached with a force great enough to pull out the insertion part from the attachment hole, the expansion of the pair of clamping plates, which receive forces bending outward by the receiving plate part and try to move in the direction of this pulling out, can be prevented by pressing the free ends of the clamping plates to the checking walls. Thus, it can be made such that such clip is pulled out from the attachment hole together with the insertion part in a state being fixed to the receiving plate part which is a constituent of the insertion part without being left on the side of the object receiving attachment, that is, in the attachment hole.

Also, in the fifth aspect of invention, the clip described in the first to fourth aspects further comprises a coupling part that is coupled to a coupled part provided on the insertion part pursuant to receiving of the receiving plate part which is a constituent of the insertion part of the object being attached between the pair of clamping plates.

By such constitution, when the object being attached and object receiving attachment which once were attached together via the clip are separated by pulling the side of the object being attached with a force great enough to pull out the insertion part from the attachment hole, by the coupling of the coupling part provided on the side of the clip and the coupled part provided on the insertion part, it can be made such that such clip is pulled out from the attachment hole together with the insertion part in a state being fixed to the receiving plate part which is a constituent of the insertion part without being left on the side of the object receiving attachment, that is, in the attachment hole.

Also, in the sixth aspect of the invention, the coupling part in the clip described in the fifth aspect is made as hooks that forces the pair of clamping plates to expand outward by abutting against bumps that serve as the coupled part formed on the receiving plate part pursuant to receiving of the receiving plate part. The hooks are coupled to the bump by riding past the bumps due to the expanding of this pair of clamping plates and returning on the clamping plates at the position rode past.

By such constitution, when the object being attached and the object receiving attachment which once were attached together via the clip are separated by pulling the side of the object being attached with a force great enough to pull out the insertion part from the attachment hole, by the coupling of the hooks which constitute the coupling part provided on the side of the clip and the bumps provided on the side of the insertion part, it can be made such that such clip is pulled out from the attachment hole together with the insertion part in a state being fixed to the receiving plate part which is a constituent of the insertion part without being left on the side of the object receiving attachment, that is, in the attachment hole.

Also, in the seventh aspect of the invention, the coupling part in the clip described in the fifth aspect is made as hooks that once force the pair of clamping plates to expand outward by abutting against side surfaces of the receiving plate part pursuant to receiving of the receiving plate part, and are coupled by entering into a hole that serves as the coupled part which is formed on the receiving plate part due to springing back of the pair of clamping plates.

By such constitution, when the object being attached and the object receiving attachment which once were attached together via the clip are separated by pulling the side of the object being attached with a force great enough to pull out the insertion part from the attachment hole, by the coupling of the hooks which constitute the coupling part provided on the side of the clip and the hole provided on the side of the insertion part, it can be made such that such clip is pulled out from the attachment hole together with the insertion part in a state being fixed to the receiving plate part which is a constituent of the insertion part without being left on the side of the object receiving attachment, that is, in the attachment hole.

Also, in the eighth aspect of the invention, the coupling part in the clip described in the fifth aspect is made as elastic bumps that are elastically deformed once abutting against bumps that serve as the coupled-part, which are formed on a pair of side walls that is formed on the insertion part of the object being attached so as to sandwich the receiving plate part in between, pursuant to receiving of the receiving plate part between the pair of clamping plates, and ride past the bumps and are coupled to the bumps by elasticity at the positions rode past.

By such constitution, when the object being attached and the object receiving attachment which once were attached together via the clip are separated by pulling the side of the object being attached with a force great enough to pull out the insertion part from the attachment hole, by the coupling of the elastic bumps provided on the sides of the clip and the bumps provided on the sides of the insertion part, it can be made such that such clip is pulled out from the attachment hole together with the insertion part in a state being fixed to the receiving plate part which is a constituent of the insertion part without being left on the side of the object receiving attachment, that is, in the attachment hole.

DETAILED DESCRIPTION OF PREFERRED EMBODIMENTS

Figure 1:
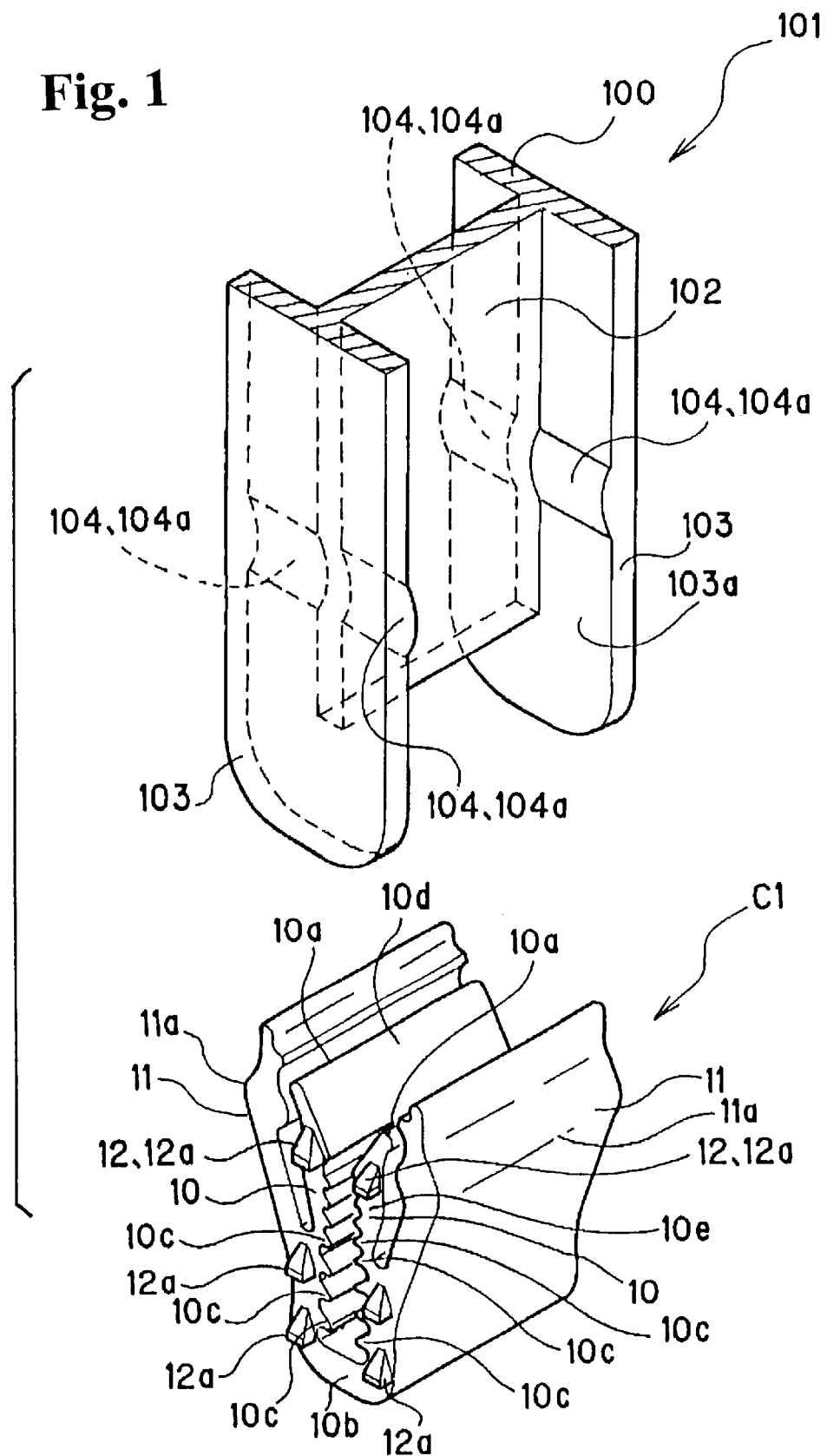
FIG. 1 is a perspective view separately showing a clip and an insertion part pertaining to the first embodiment.
Figure 2:
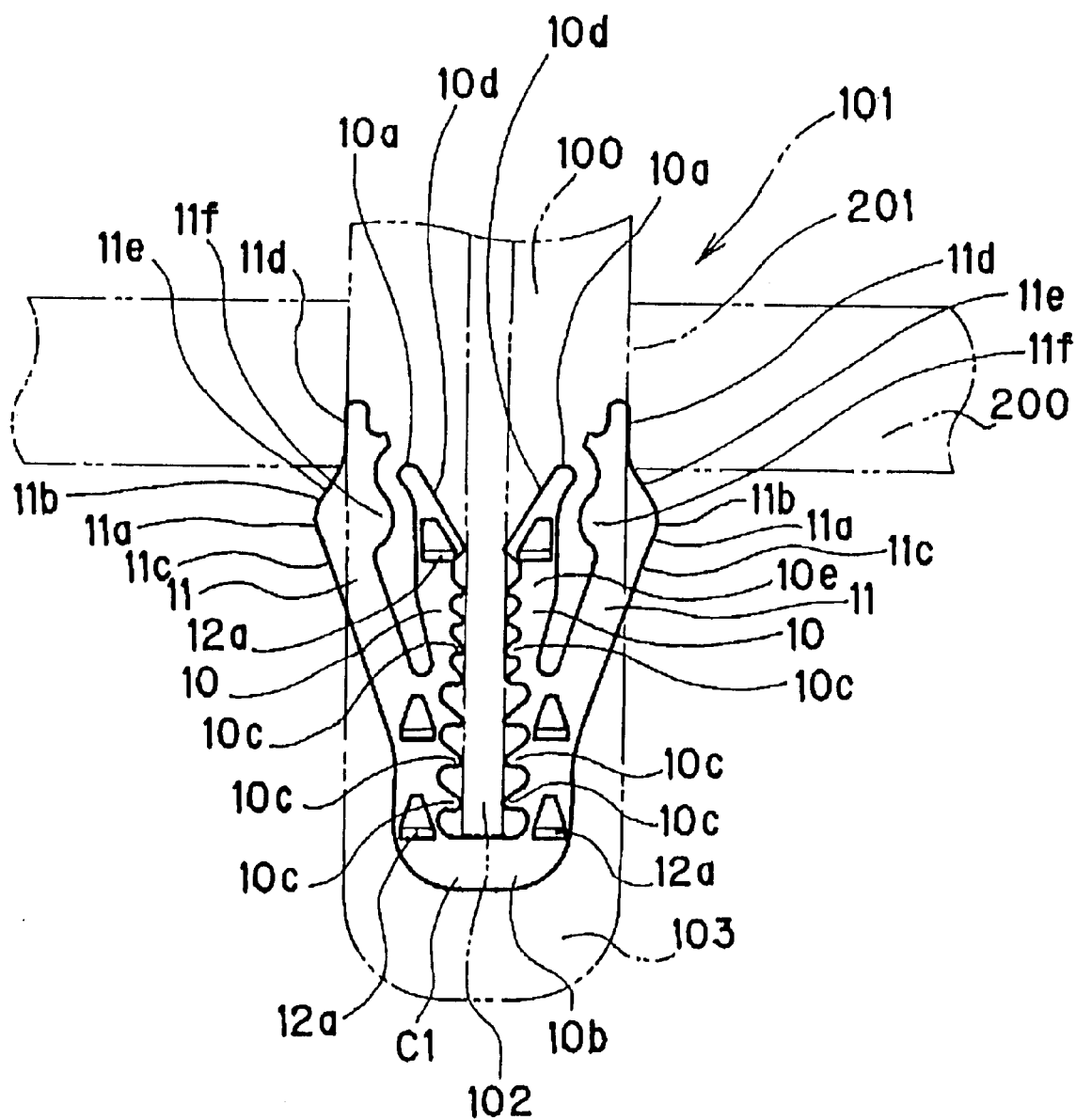
FIG. 2 is a side view showing the assembled state of an object being attached and an object receiving attachment by the clip.

Below, typical examples of the clip pertaining to this invention are explained based on FIG. 1 through FIG. 15.

Clips C1–C4, which pertain to the examples, are used for attaching an object 100 being attached to an object receiving attachment 200 with one touch, by being fixed around an insertion part 101 of the object 100 being attached which is inserted into an attachment hole 201 opened in the object receiving attachment 200, and being coupled to the attachment hole 201 by the insertion of this insertion part 101 into the attachment hole 101. Typically, these clips C1–C4 can be constituted by molding such as injection molding a using plastic material.

For example, they are used such that internally installed components of an automobile with the insertion part 101 can be attached with one touch to an instrument panel with the attachment hole 201 being formed, by inserting such insertion part 101 into the attachment hole 201.

First, the clip C1 which is shown in FIG. 1 through FIG. 4 is explained.

Such clip C1 comprises a pair of clamping plates 10 that receive therebetween a receiving plate part 102, which is a constituent of an insertion part 101 provided on an object being attached 100 and is long in the direction of insertion of the insertion part 101, and coupling arms 11 provided outside the respective clamping plates 10.

Such clamping plate 10 is connected integrally with the other clamping plate 10 by a connecting part 10b at the opposite side (below, called the base part side of the clamping plate 10) to the receiving side (below, called free end 10a side of the clamping plate 10) of the receiving plate part 102. Also, in this example, it is constituted such that the receiving plate part 102 can be inserted between the pair of the clamping plates 10 up to the position where the tip of the receiving plate part 102 abuts against the inner surface of this connecting part 10b.

Also, in this example, such receiving plate part 102 is provided so as to cross between a pair of side plates 103 which arrange side walls 103a in a direction substantially orthogonally to the plate surface of the receiving plate part 102, and the insertion part 101 is formed by this receiving plate part 102 and the pair of side plates 103. Specifically, such side plates 103 also are constituted so as to be long in the direction of insertion of the insertion part 101. Also, the side plates 103 are formed to be longer than the receiving plate part 102, and the tips of the side plates 103 are made to project in the forward direction of insertion more than the tip of receiving plate part 102. Also, such receiving plate part 102 is provided substantially along the middle position in the width direction of the side plates 103, and it is constituted such that the space between the pair of side plates 103 is divided into left and right by the receiving plate part 102.

Also, in this example, a plurality of teeth 10c, the tips of which are pressed to receiving the plate part 102 of the object 100 being attached, is respectively provided on the mutually facing sides of the pair of the clamping plates 10 (below, called the inner surface side of the clamping plates 10) so as to form a multiple stage pattern in the direction of insertion into the attachment hole 201.

Specifically, in this example, each tooth 10c is constituted as a rib-shaped body that is provided on the inner surface side of the clamping plate 10 and crosses in the width direction of the clamping plate 10. Also, between the teeth 10c, there is respectively formed an interval. Also, in this example, it is constituted such that the interval between the virtual surface on which the tips of the teeth 10c formed on one clamping plate 10 are positioned and the virtual surface on which the tips of the teeth 10c formed on the other clamping plate 10 are positioned becomes somewhat narrower than the plate thickness of the receiving plate part 102 which is inserted between such pair of clamping plates 10. Also, it is constituted such that each clamping plate 10 is made capable of elastic deformation in the direction of being separated from the other clamping plate 10 generally about the base part side.

As a result, in this example, by inserting the receiving plate part 102 between the pair of clamping plates 10 from its free end 10a side, the receiving plate part 102 can be clamped by such pair of clamping plates 10 while the pair of clamping plates 10 is caused to elastically expand outward such that each of the pluralities of teeth 10c respectively provided on the pair of clamping plates 10 is pressed on the plate surface of the receiving plate part 102 inserted in this manner, and the clip C1 can be fixed around the receiving plate part 102 by this clamping.

Also, because such plurality of teeth 10c is provided so as to form a multiple stage pattern across the direction of insertion of the insertion part 101 into the attachment hole 201, that is, the direction of entry of the receiving plate part 102, the teeth 10c can be pressed against the receiving plate part 102 by the elastic forces of the clamping plates 10 in a plurality of locations across the direction of insertion of the receiving plate part 102 from both sides of the receiving plate part 102, and the state of fixing of the receiving plate part 102 between such pair of clamping plates 10 can be maintained with stability.

Also, because the elastic forces of the clamping plates 10 act on the receiving plate part 102 at points with the tips of the plurality of teeth 10c, the receiving plate part 102 can be clamped properly by the pair of clamping plates 10, even when there is some unevenness on the plate surfaces of such receiving plate part 102.

In this example, on the inner surface side of the pair of clamping plates 10 in a location from the free end 10a to the tooth in the position nearest to this free end 10a, there is formed an inclined surface 10d that inclines in a direction gradually separating from the inner surface of the other clamping plate 10 when going toward the free end 10a, and it is made such that the insertion of the receiving plate part 102 between such pair of clamping plates 10 from the free end 10a side can be performed smoothly by guiding the tip of the receiving plate part 102 with the inclined surface 10d.

Also, the plurality of teeth 10c provided on the clamping plates 10 respectively is constituted such that the upper surface facing the free end 10a side is made to incline in the direction gradually approaching the base part from the root side to the tip side of the teeth, such that the tip of the receiving plate part 102 easily rides past each tooth 10c by the inclination of this upper surface.

Also, in this example, on the outside of each clamping plate 10, there is provided the plate-shaped coupling arm 11 that has an inner surface facing the outer surface of the clamping plate 10 and has the same width as that of the clamping plate 10.

Specifically, such coupling arm 11 is constituted such that one end thereof is integrally connected in a position substantially in the middle in the length direction of the clamping plate 10, such that it can be elastically bent inward in the direction approaching the clamping plate 10 around this connected position. Also, such coupling arm 11 is formed to a length such that its tip is positioned above the free end 10a of the clamping plate 10, and it has a coupling bump 11a on the outside part.

Also, in this example, it is constituted such that the interval between the apexes 11b of the coupling bumps 11a of such pair of coupling arms 11 becomes greater than the hole width of the attachment hole 201 opened in the object receiving attachment 200.

As a result, in this example, by inserting the receiving plate part 102 between the pair of the clamping plates 10 and attaching the clip C1 to the insertion part 101 of the object 100 being attached, and then inserting this insertion part 101 into the attachment hole 201 of the object receiving attachment 200, the bumps 11a of the coupling arms 11 abut against the hole edge part on the front side of insertion in the attachment hole 201 and the coupling arms 11 are once elastically bent inward, and then the coupling arms 11 are caused to return to the final positions of insertion of this insertion part 101 in the attachment hole 201. Thus, the coupling bump 11a can be coupled to the hole edge part of the attachment hole 201 at the far ends of the coupling arms 11. By this, the object 100 being attached can be attached to the object receiving attachment 200 via the clip C1 with one touch.

In this example, on the outer surface side of the coupling arm 11, there is formed an inclined surface 11c that inclines so as to gradually widen outward toward the apex 11b of the coupling bump 11a from the side of connection with the clamping plate 10 on this coupling arm 11, such that the coupling arm 11 can be bent inward smoothly by the inclined surface 11c being caused to abut against the hole edge part on the front side of insertion in the attachment hole 201 pursuant to insertion of the insertion part 101 into the attachment hole 201.

Also, between such coupling bump 11a and the tip of coupling arm 11, there is formed a fitting surface 11d along the direction of insertion which is pressed against the inner surface of the attachment hole 201 at the final position of insertion.

Also, in this example, it is constituted such that the coupling bump 11a of the coupling arm 11 is coupled on the side of this fitting surface 11d to the hole edge part on the far end of insertion into the attachment hole 201.

Figure 3:
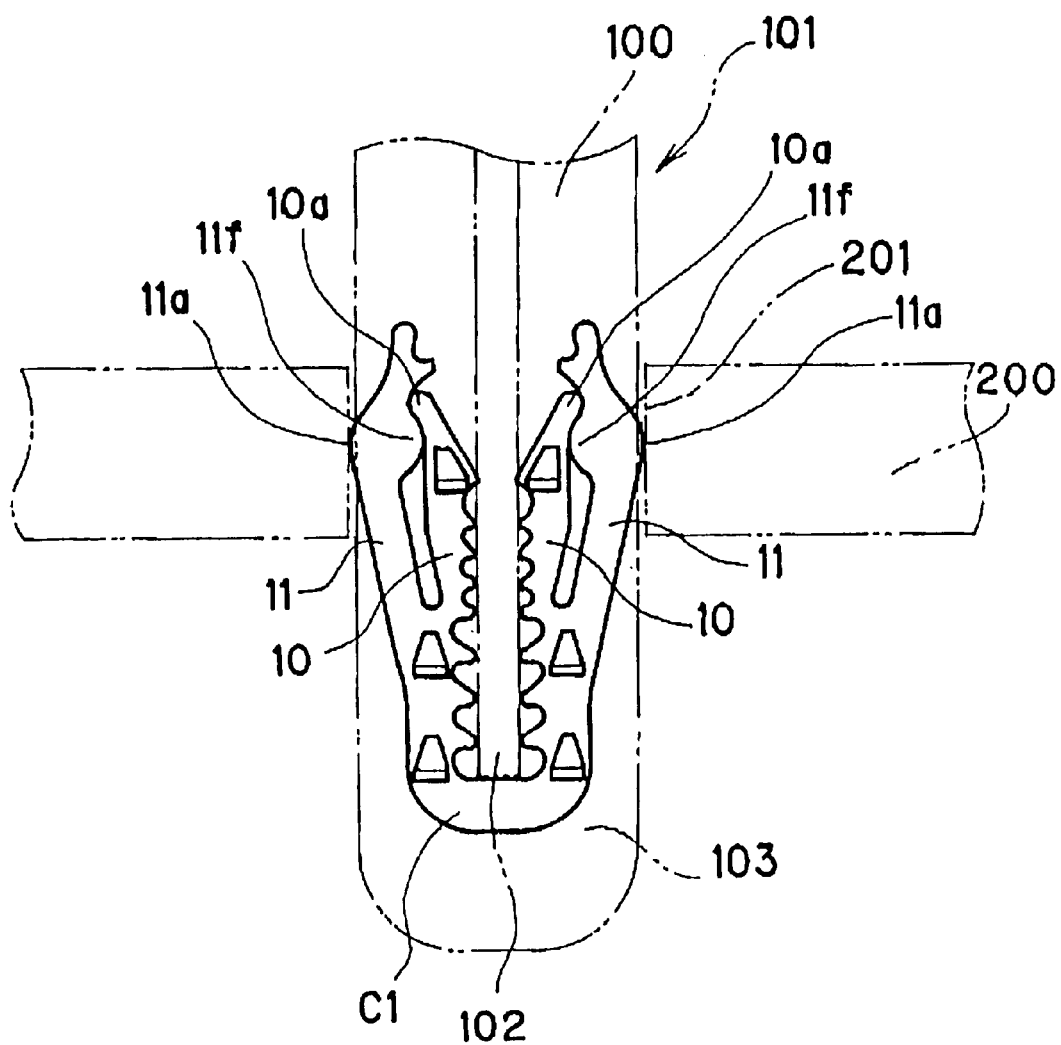
FIG. 3 is a side view showing the state in which the side of the object being attached is pulled in the direction of pulling out the insertion part from the attachment hole following the state in FIG. 2.
Figure 4:
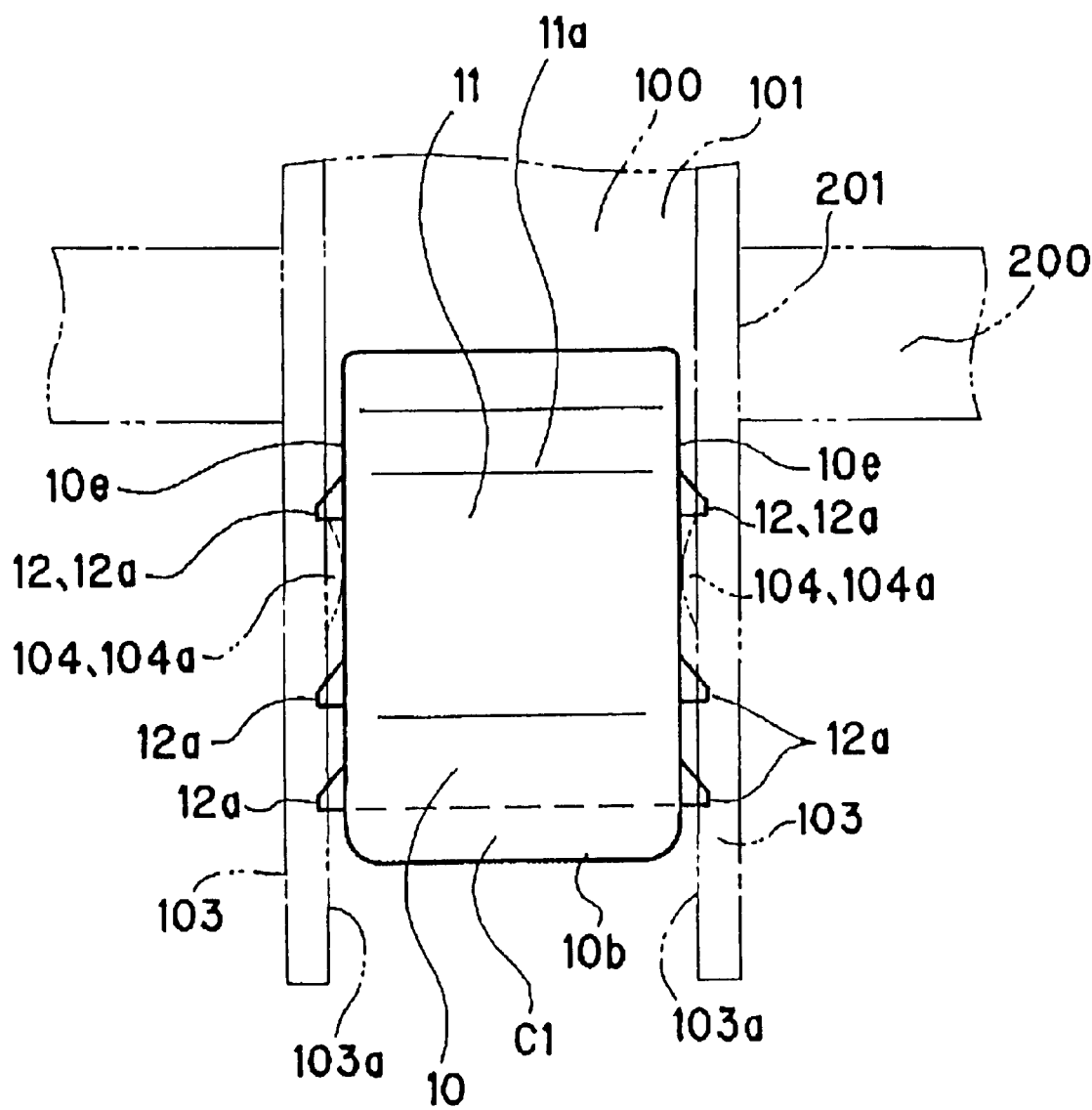
FIG. 4 is a side view showing the state in FIG. 2 from a position 90 degrees different from FIG. 2.

Also, in this example, it is constituted such that the free ends 10a of the pair of clamping plates 10 having received the receiving plate 102, which constitutes the insertion part 101, are pressed from outside by the coupling arms 11 which are pressed by the hole edge parts of the attachment hole 201 and are bent inward, when a force in the direction of pulling out the insertion part 101 from the attachment hole 201 of the object receiving attachment 200 is applied (FIG. 3).

Specifically, in this example, the coupling bump 11a of the coupling arm 11 has an inclined surface 11e that inclines inward gradually toward the fitting surface 11d from the apex 11b of the coupling bump 11a on the side of the fitting surface 11d. When the side of the object 100 being attached is pulled with the required force in the direction of separating from the object receiving attachment 200, following the state of the attachment with the object 100 being attached and the object receiving attachment 200 in which such coupling bumps 11a were coupled to the hole edge part at the far ends of insertion in the attachment hole 201, the inclined surfaces 11e are pressed against the hole edge part of the attachment hole 201 at the far ends of insertion and the coupling arms 11a are again caused to be bent inward. Thus, the coupling of the coupling bumps 11a is released and the coupling bumps 11a are entered into the attachment hole 201, such that the insertion part 101 with the clip C1 can be removed again from the attachment hole 201.

In addition to that, an uplifted part 11f formed on the inner surface part on the free end 10a side of the coupling arm 10a which was bend inward pursuant to the operation of pulling out of this insertion part 101 is pressed against the outer surface part on the free end 10a side of the clamping plate 10, such that the pair of clamping plates 10 is pressed in the direction of mutually approaching by the uplifted part 11f.

As a result, in this example, when the object 100 being attached and the object receiving attachment 200 which once were attached together by the clip C1 are separated by pulling the side of the object 100 being attached with a force great enough to pull out the insertion part 101 from the attachment hole 201, the clip C1 can be pulled out from the attachment hole 201 together with the insertion part 101 in a state being fixed to the receiving plate part 102 which constitutes the insertion part 101 without being left on the side of the object receiving attachment 200, that is, in the attachment hole 201, and problems are not caused such as in re-attaching the object 100 being attached to the object receiving attachment 200.

Also, in this example, the clip C1 is provided with coupling parts 12 coupled to coupled parts 104 provided on the insertion part 101 pursuant to receiving of the receiving plate 102, which constitutes the insertion part 101 of the object 100 being attached, between the pair of the clamping plates 10.

In this example, the coupling part 12 of such clip C1 is made as elastic bumps 12*a* that are elastically deformed after once having collided with bumps 104*a* that serve as the coupled parts 104 and are formed on mutually facing side walls 103*a* of a pair of side plates 103 which constitute the object 100 being attached, pursuant to receiving the receiving plate part 102 between the pair of the clamping plates 10, and ride past the bump 104*a* and are coupled to the bumps 104*a* by the elasticity at the positions rode past.

Specifically, in this example, a plurality of elastic bumps 12*a* is provided respectively on both end surfaces 10*e* in the length direction of the clamping plates 10, and is formed on the end surfaces 10*e* to project laterally at intervals across the length of the clamping plates 10. Also, it is constituted such that the interval between the virtual surface on which the tips of the plurality of elastic bumps 12*a* formed on one end surface 10*e* of such clamping plate 10 are positioned and the virtual surface on which the tips of the plurality of the elastic bumps 12*a* formed on the other end surface 10*e* of such clamping plate 10 are positioned becomes somewhat greater than the interval between the mutually facing side walls 103*a* of the pair of side plates 103. Thus, the receiving plate part 102 is received between the pair of clamping plates 10 while this plurality of elastic bumps 12*a* is elastically deformed by being pressed against the side walls 103*a*.

In addition to that, in this example, the bumps 104*a* that form uplifted parts, which pursuant to the insertion of the receiving plate part 102 up to the position where the tip is made to collide with the inner surface of the connecting part 10*b* between the pair of clamping plates 10, once collide with the elastic bumps 12*a* on the most free end 10*a* side of these clamping plates 10, then ride past the elastic bumps 12*a* while causing the elastic bumps 12*a* to be deformed by this collision, and come in beneath the elastic bumps 12*a* and are coupled with the elastic bumps 12*a*, are respectively provided on both sides sandwiching the receiving plate part 102 in the pair of side plates 103.

As a result, in this example, when the object 100 being attached and the object receiving attachment 200 which once were attached together via the clip C1 are separated by pulling the side of the object 100 being attached with a force great enough to pull out the insertion part 101 from the attachment hole 201, also by using the coupling between the elastic bumps 12*a* provided on the sides of the clip C1 and the bumps 104*a* provided on the sides of the insertion part 101, it can be made such that the clip C1 is pulled out from the attachment hole 201 together with the insertion part 101 in a state being fixed to the receiving plate part 102 which is a constituent of the insertion part 101 without being left on the side of the object receiving attachment 200, that is, in attachment hole 201.

In this example, each of such plurality of elastic bumps 12*a* has a side surface provided on the free end 10*a* side of the clamping plate 10 inclined in a direction gradually moving away from the free end b0*a* while going toward the tip of the elastic bump 12*a*. Thus, by using these inclined side surfaces, the clip C1 is easy to insert between the pair of side plates, which are a constituent of the insertion part, while causing the elastic bumps 12*a* to be elastically deformed from the side of the tips of the side plates.

It also may be constituted such that the plurality of teeth 10*c* provided on the inner surface side of the clamping plates 10 further has elasticity.

In this case, the springing force or elasticity of such teeth 10*c* can be made to act further on the receiving plate part 102 having been inserted between the pair of clamping plates 10, and the state of fixing between the receiving plate part 102 and the clip C1 can be further improved.

Figure 5:
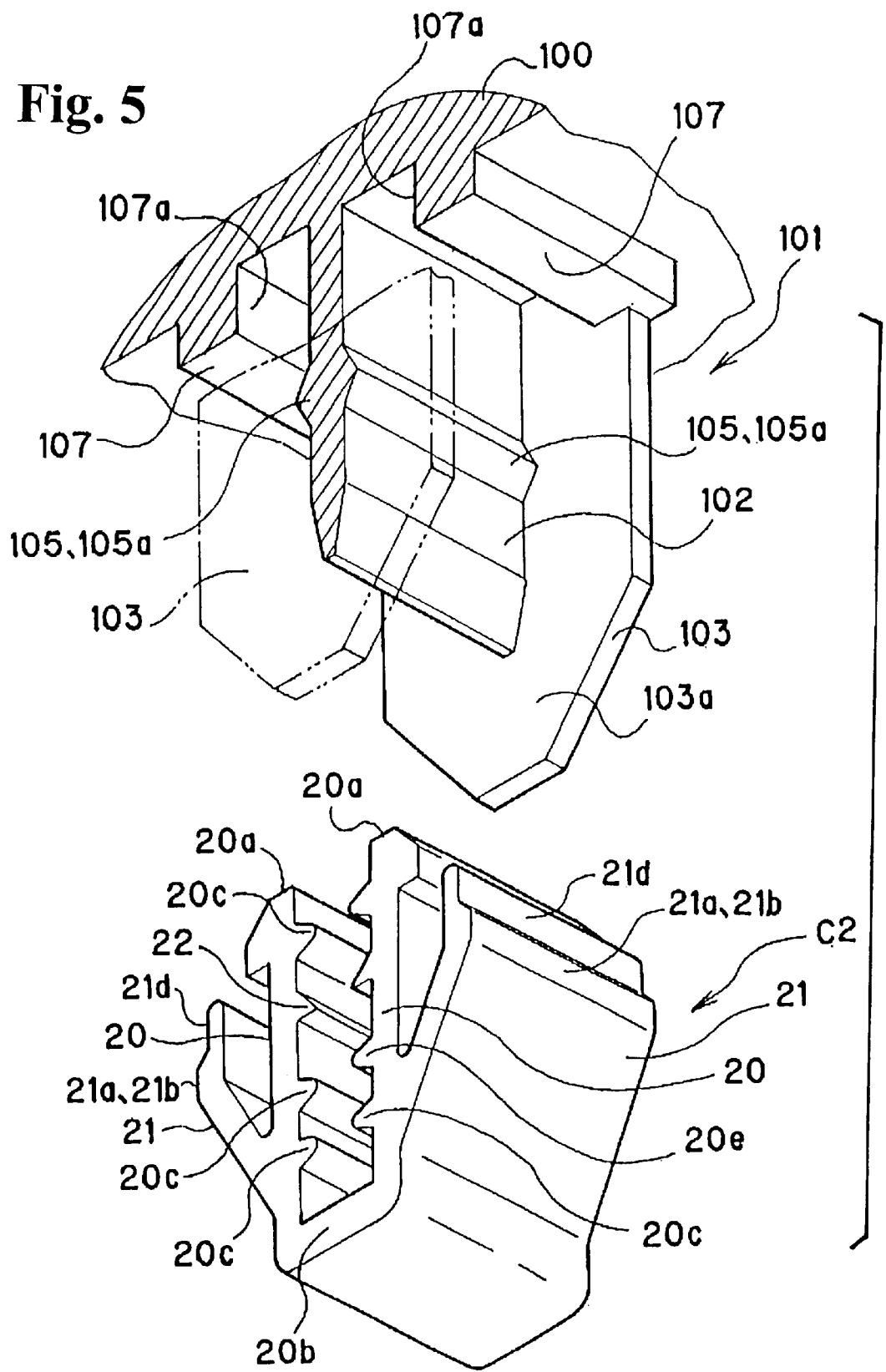
FIG. 5 is a perspective view separately showing a clip and an insertion part pertaining to the second embodiment.
Figure 6:
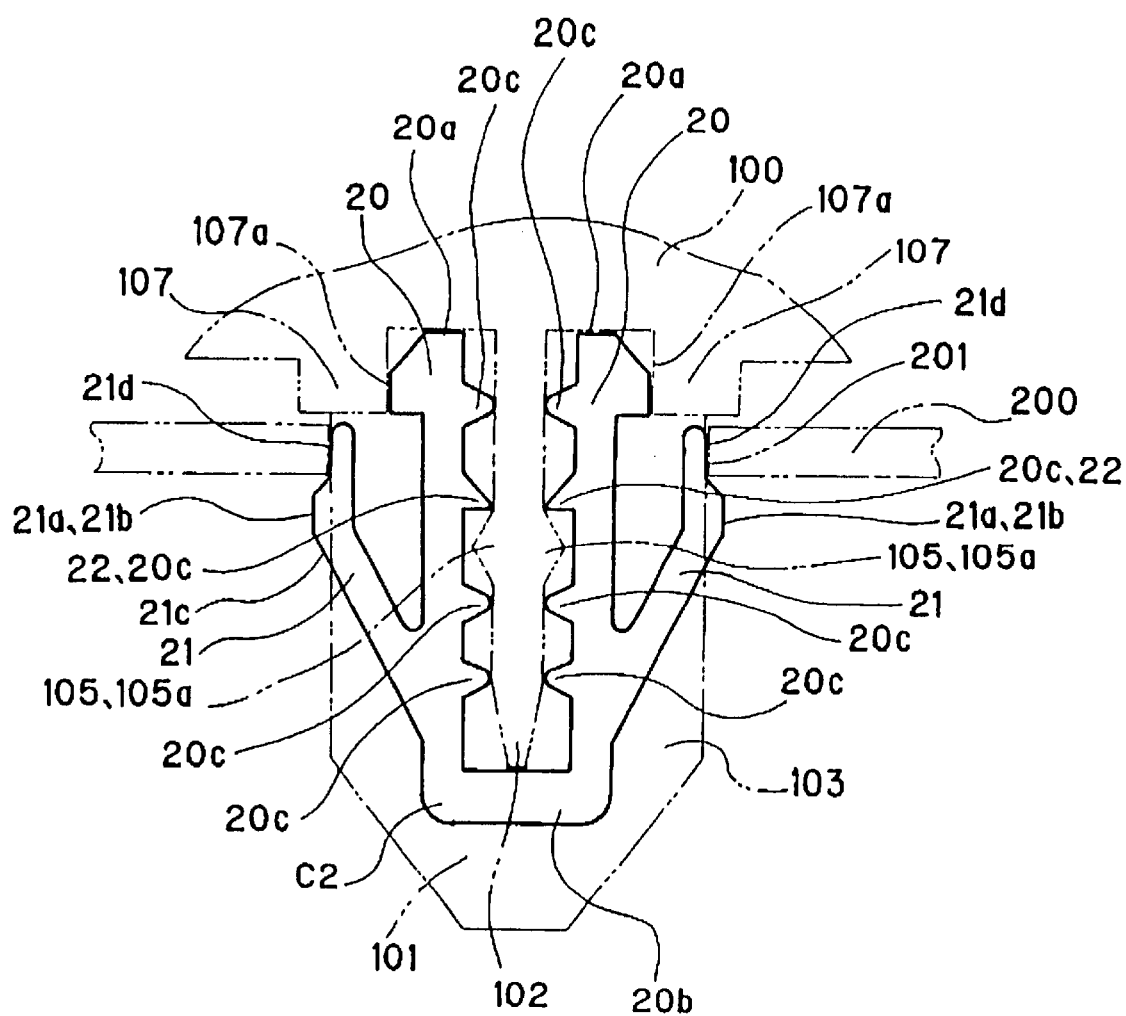
FIG. 6 is a side view showing the assembled state of the object being attached and the object receiving attachment by the clip.

Next, a clip C2 which is shown in FIG. 5 and FIG. 6 is explained.

Such clip C2 comprises a pair of clamping plates 20 that receive therebetween the receiving plate part 102, which is a constituent of the insertion part 101 provided on the object 100 being attached and is long in the direction of insertion of the insertion part 101, and coupling arms 21 provided outside the pair of clamping plates 20.

Such clamping plate 20 is connected integrally with the other clamping plate 20 by a connecting part 20*b* at the opposite side (below, called the base part side of clamping plate 20) to the receiving side (below, called free end 20*a* side of the clamping plate 20) of the receiving plate part 102. Also, in this example, it is constituted such that the receiving plate part 102 can be inserted between the pair of clamping plates 20 up to the position where the tip of the receiving plate part 102 abuts against the inner surface of this connecting part 20*b*.

Also, in this example, such receiving plate part 102 is provided so as to cross between a pair of the side plates 103 which arrange side walls 103*a* in a direction substantially orthogonally to the plate surface of the receiving plate part 102, and the insertion part 101 is formed by this receiving plate part 102 and the pair of side plates 103. Specifically, such side plates 103 also are constituted so as to be long in the direction of insertion of the insertion part 101. Also, the side plates 103 are formed to be longer than the receiving plate part 102, and the tips of the side plates 103 are made to project in the forward direction of insertion more than the tip of the receiving plate part 102. Also, such receiving plate part 102 is provided substantially along the middle position in the width direction of the side plates 103, and the space between the pair of side plates 103 is divided into left and right by the receiving plate part 102.

Also, in this example, a plurality of teeth 20*c*, the tips of which are pressed to the receiving plate part 102 of the object 100 being attached, is respectively provided on the mutually facing sides of the pair of clamping plates 20 (below, called the inner surface side of the clamping plates 20) so as to form a multiple stage pattern in the direction of insertion into the attachment hole 201.

Specifically, in this example, each tooth 20*c* is constituted as a rib-shaped body that is provided on the inner surface side of the clamping plate 20 and crosses in the width direction of the clamping plate 20. Also, between the teeth 20*c*, there is respectively formed an interval. Also, in this example, it is constituted such that the interval between the virtual surface on which the tips of the teeth 20*c* formed on one clamping plate 20 are positioned and the virtual surface on which the tips of the teeth 20*c* formed on the other clamping plate 20 are positioned becomes somewhat narrower than the plate thickness of the receiving plate part 102 which is inserted between such pair of clamping plates 20. Also, it is constituted such that each clamping plate 20 is made capable of elastic deformation in the direction of being separated from the other clamping plate 20 generally around the base part.

As a result, in this example, by inserting the receiving plate part 102 between the pair of clamping plates 20 from its free end 20*a* side, the receiving plate part 102 can be clamped by such pair of clamping plates 20 while the pair of clamping plates 20 is caused to elastically expand outward such that the teeth 20*c* respectively provided on the pair of clamping plates 20 are pressed against the plate surfaces of the receiving plate part 102 inserted in this manner. The clip C2 can be fixed around the receiving plate part 102 by this clamping.

Also, because such plurality of teeth 20*c* is provided so as to form a multiple stage pattern across the direction of insertion of the insertion part 101 into the attachment hole 201, that is, the direction of entry of the receiving plate part 102, the teeth 20*c* can be pressed against the receiving plate part 102 by the springing or elastic force of the clamping plates 20 in a plurality of locations across the direction of insertion of the receiving plate part 102 from both sides of the receiving plate part 102. Thus, the state of clamping of the receiving plate part 102 between such pair of clamping plates 20 can be maintained with stability.

Also, because the springing or elastic forces of the clamping plates 20 act on the receiving plate part 102 at the tips of the plurality of teeth 20*c*, the receiving plate part 102 can be clamped properly by the pair of clamping plates 20 even when there is some unevenness on the plate surfaces of such receiving plate part 102.

Also, in this example, on the outside of the pair of clamping plates 20, there are provided plate-shaped coupling arms 21 having inner surfaces facing the outer surfaces of the clamping plates 20 with the same width as that of the clamping plate 20.

Specifically, such coupling arm 21 is constituted such that one end thereof is integrally connected in a position near the connecting part 20*b* of the clamping plate 20, such that it can be elastically bent inward in the direction approaching the clamping plate 20 about this connected position. Also, in this example, such coupling arm 21 is formed to a length such that its tip is positioned below the free end 20*a* of the clamping plate 20, and it respectively has a coupling bump 21*a* on the outside part.

Also, in this example, it is constituted such that the interval between the apexes 21*b* of the coupling bumps 21*a* of such pair of coupling arms 21 becomes greater than the hole width of the attachment hole 201 opened in the object receiving attachment 200.

As a result, in this example, by inserting the receiving plate part 102 between the pair of clamping plates 20 to attach the clip C2 to the insertion part 101 of the object 100 being attached, and then inserting this insertion part 101 into the attachment hole 201 of the object receiving attachment, the coupling bumps 21*a* of the coupling arms 21 abut against the hole edge part on the front side of insertion in the attachment hole 201. The coupling arms 21 are once elastically bent inward, and then the coupling arms 21 are returned at the final position of insertion of this insertion part 101 into the attachment hole 201, so that the coupling bumps 21*a* can be coupled to the hole edge part of the attachment hole 201 at the far end of inserting the coupling arms 21. Thus, the object 100 being attached can be attached to the object receiving attachment 200 via the clip C2 with one touch.

In this example, on the outer surface side of the coupling arm 21, there is formed an inclined surface 21*c* that inclines so as to gradually widen outward toward the apex 21*b* of the coupling bump 21*a* from the side of the connection with the clamping plate 20 on this coupling arm 21, such that the coupling arm 21 can be bent inward smoothly by the inclined surface 21*c* upon abutting against the hole edge part on the front side of insertion in the attachment hole 201.

Also, between such coupling bump 21*a* and the tip of the coupling arm 21, there is formed a fitting surface 21*d* extending along the direction of insertion, which is pressed against the inner surface of the attachment hole 201 at the final position of insertion.

Also, in this example, it is constituted such that the coupling bump 21*a* of the coupling arm 21 is coupled on the side of this fitting surface 21*d* to the hole edge part on the far end of insertion into the attachment hole 201.

Also, in this example, the clip C2 is provided with coupling parts 22 coupled to coupled parts 105 provided on the insertion part 101 pursuant to receiving of the receiving plate 102, which is a constituent of the insertion part 101 of the object 100 being attached, between the pair of clamping plates 20.

In this example, the coupling parts 22 of such clip C2 are made as parts of the plurality of teeth 20*c* provided on the clamping plates 20, which are coupled to the bumps 105*a* that serve as the coupled parts 105 formed on both surface sides of the receiving plate part 102, which constitute the insertion part 101 of the object 100 being attached, pursuant to receiving of the receiving plate part 102 between the pair of clamping plates 20.

Specifically, in this example, it is constituted such that the teeth 20*c*, each being the second tooth counting from the free end 20*a* side of the clamping plate 20 among the plurality of teeth 20*c* provided on each side of the clamping plate 20, collide with the bumps 105*a* that serve as the coupled parts 105 which are formed on the receiving plate part 102 and cause the clamping plates 20 to be expanded outward pursuant to receiving of the receiving plate part 102 between this pair of clamping plates 20, and ride past the bumps by the expansion of this pair of clamping plates 20, and are coupled with the bumps by elasticity of the pair of clamping plates 20 at the position rode past.

As a result, in this example, when the object 100 being attached and object receiving attachment 200 which once were attached together via the clip C2 are separated by pulling the side of the object 100 being attached with a force great enough to pull out the insertion part 101 from the attachment hole 201, by the coupling of the teeth 20*c* which constitute the coupling parts 22 provided on the sides of the clips C2 and the bumps 105*a* provided on the sides of the insertion part 101, it can be made such that such clip C2 is pulled out from the attachment hole 201 together with the insertion part 101 in a state being fixed to the receiving plate part which constitutes the insertion part 101, without being left on the side of the object receiving attachment 200, that is, in the attachment hole 201.

It also may be constituted such that the plurality of teeth 20*c* provided on the inner surface sides of the clamping plates 20 further has elasticity.

In this case, the springing or elastic forces of such teeth 20*c* can act further on the receiving plate part 102 having been inserted between the pair of clamping plates 20, and the state of fixing between the receiving plate part 102 and clip C2 can be further improved.

Also, in this example, it is constituted such that the free ends 20*a* of the pair of clamping plates 20 having received the receiving plate part 102 which constitutes the insertion part 101 are positioned between a pair of checking walls 107a provided on the sides of the protruding base part of the insertion part 101 of the object 100 being attached. Thus, the outward expansion is prevented by colliding therewith when a force in the direction of pulling out the insertion part 101 from the attachment hole 201 of the object receiving attachment 200 is applied.

More specifically, in this example, on each side of the receiving plate part 102 which constitutes the insertion part 101 of the object receiving attachment 100, there is formed a checking bump 107 having a checking wall 107a facing the plate surface of this receiving plate part 102 so as to cross between the bases of the pair of side plates 103. In addition to that, it is formed such that the interval between the outside parts of the free ends 20a of the clamping plate 20 is somewhat smaller than the interval between the pair of checking walls 107a. Also, the free ends 20a of such pair of clamping plates 20 are respectively positioned inside the checking bumps 107a at the final position of insertion of the receiving plate part 102 where the tip of the receiving plate part 102 abuts against the inner surface of the connecting part 20b between this pair of clamping plates 20.

As a result, in this example, when the object 100 being attached and object receiving attachment 200 which once were attached together via the clip C2 are separated by pulling the side of the object 100 with a force great enough to pull out the insertion part 101 from the attachment hole 201, the outward expansions of the pair of clamping plates 20 which receive forces bending outward by receiving the plate part 102 which is moved in this direction of pulling out can be checked by pressing the free ends 20a of the clamping plates 20 against the checking walls 107a. By this, it can be made such that such clip C2 is pulled out from the attachment hole 201 together with the insertion part 101 in a state being fixed to the receiving plate part 102 which constitutes the insertion part 101 without being left on the side of the object receiving attachment 200, that is, in the attachment hole 201.

Figure 7:
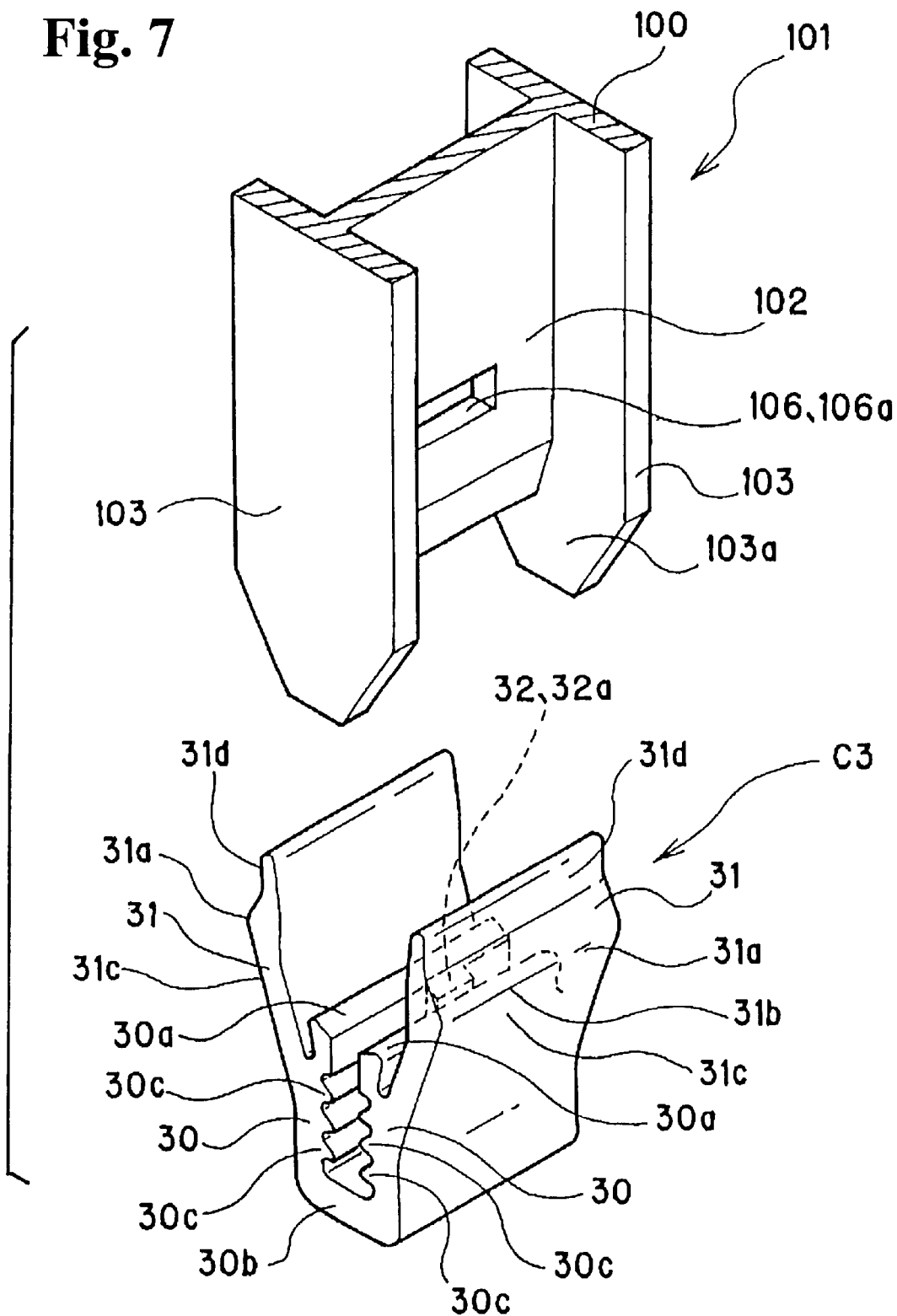
FIG. 7 is a perspective view separately showing a clip and an insertion part pertaining to the third embodiment.
Figure 8:
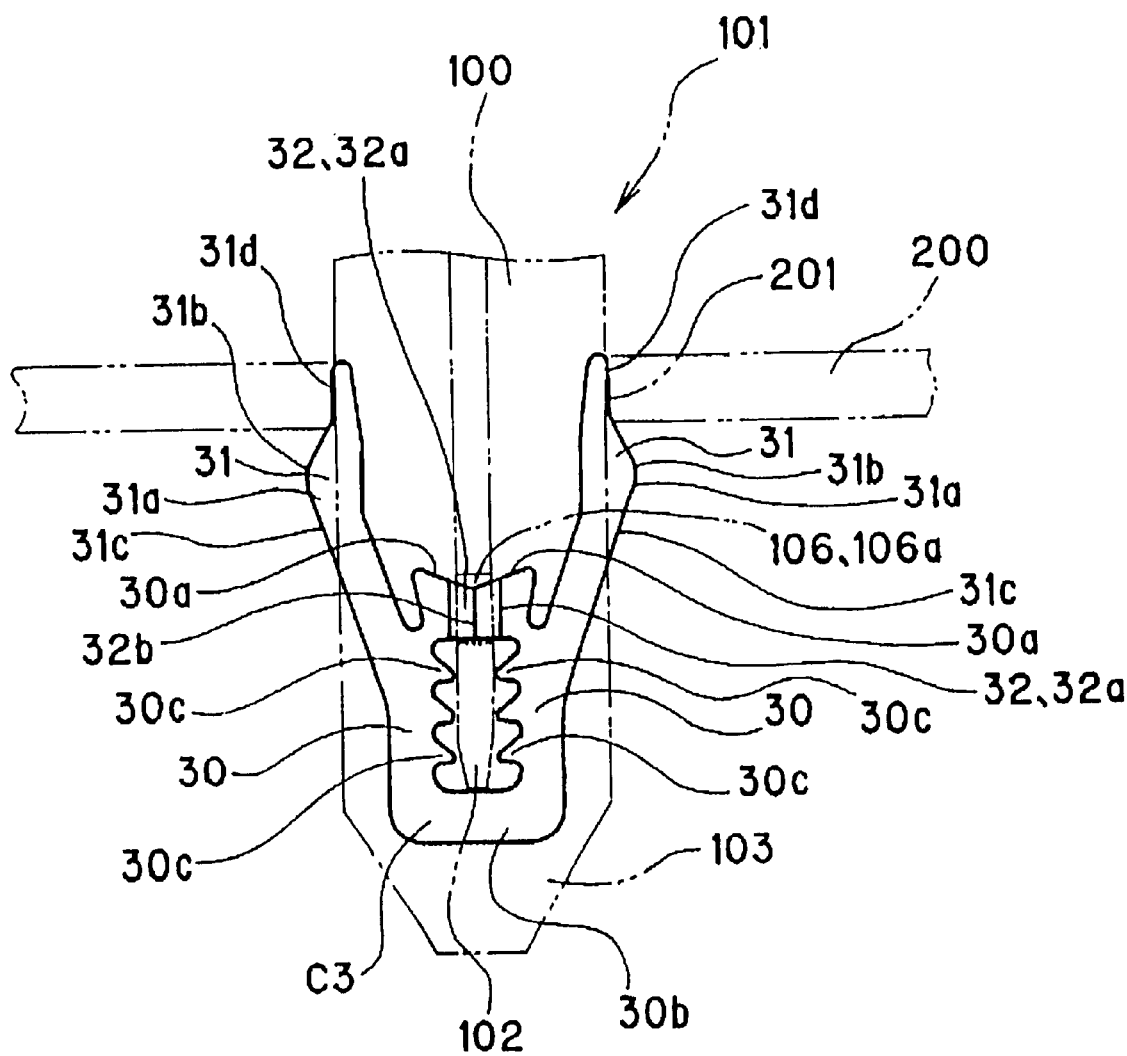
FIG. 8 is a side view showing the assembled state of the object being attached and the object receiving attachment by the clip.
Figure 9:
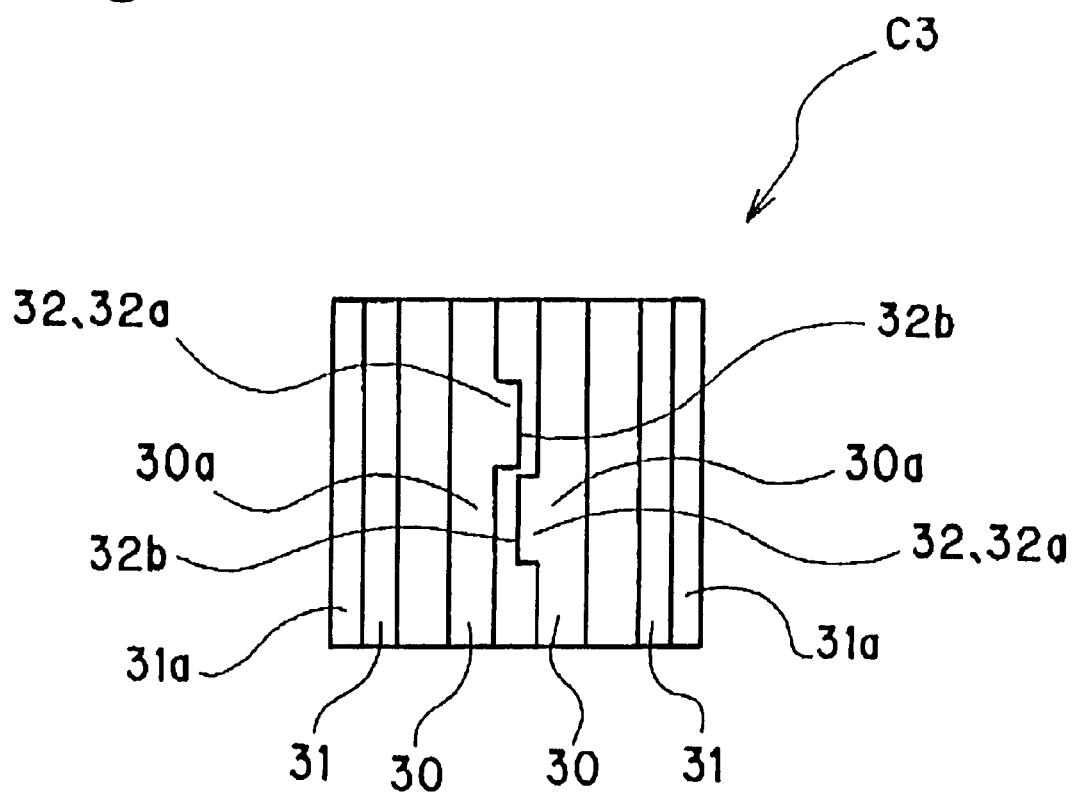
FIG. 9 is a plan view of the clip.
Figure 10:
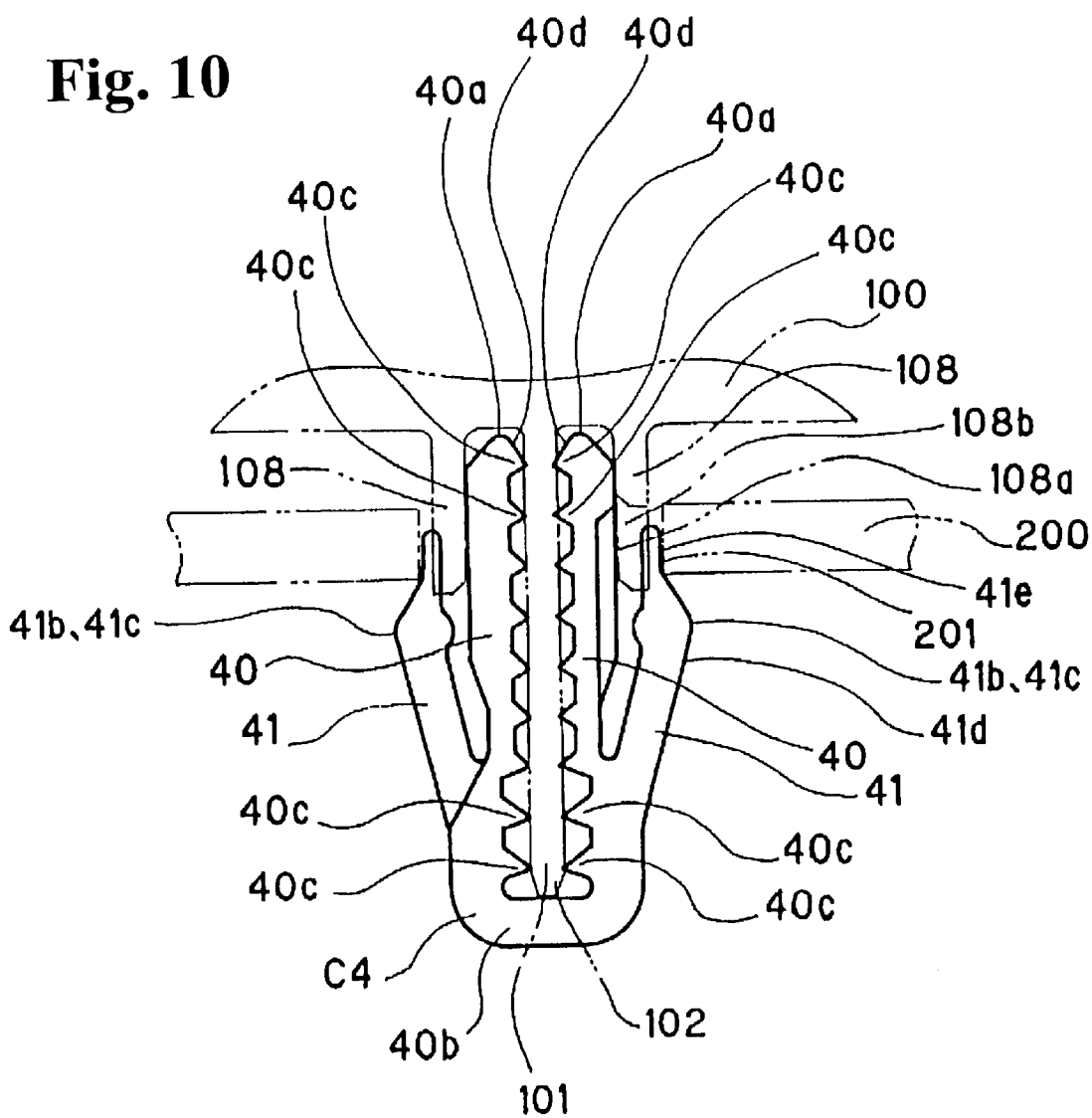
FIG. 10 is a side view showing the assembled state of the object being attached and the object receiving attachment by a clip of the fourth embodiment.
Figure 11:
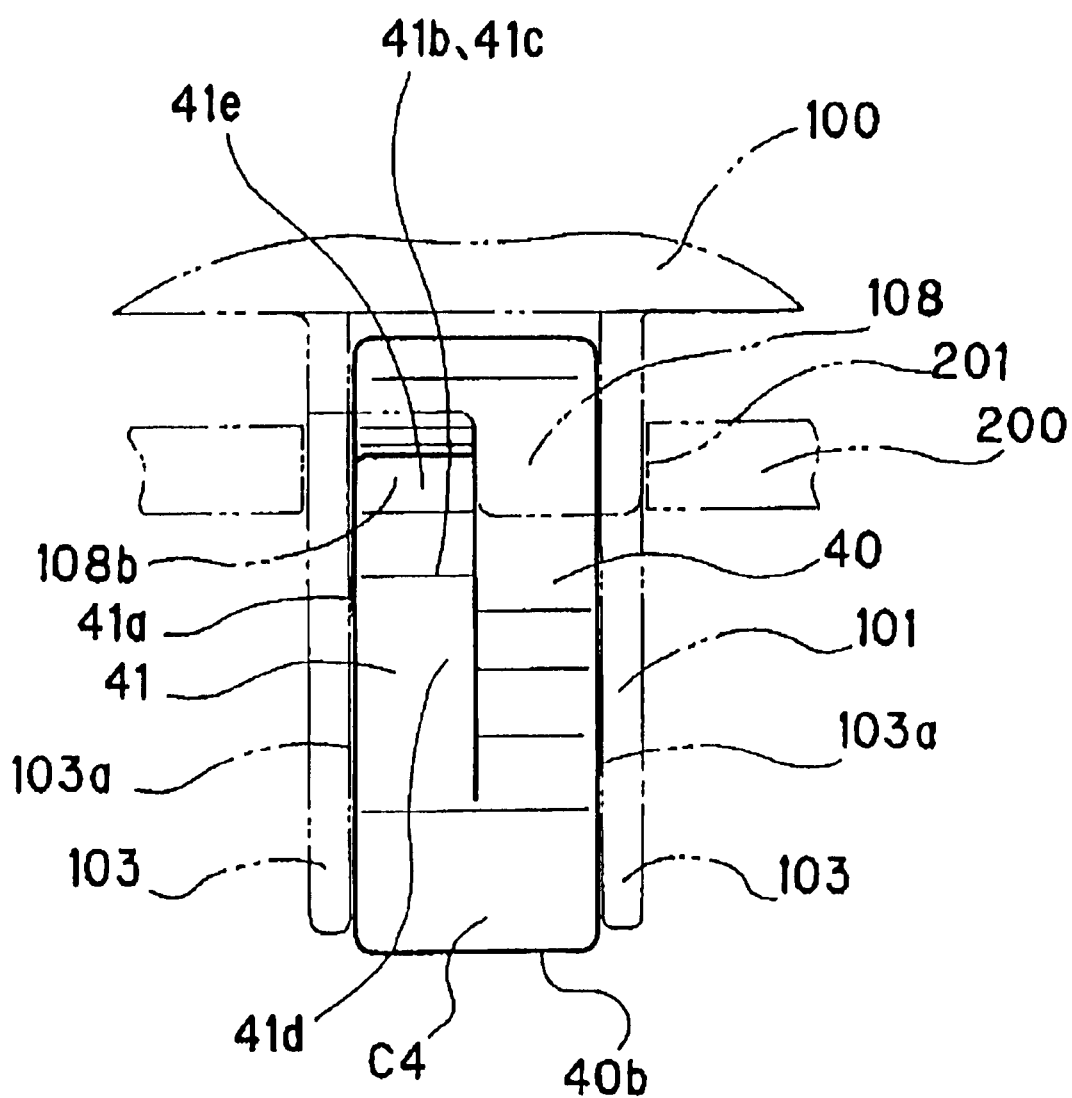
FIG. 11 is a side view showing the state in FIG. 10 from a position 90 degrees different from FIG. 10.
Figure 12:
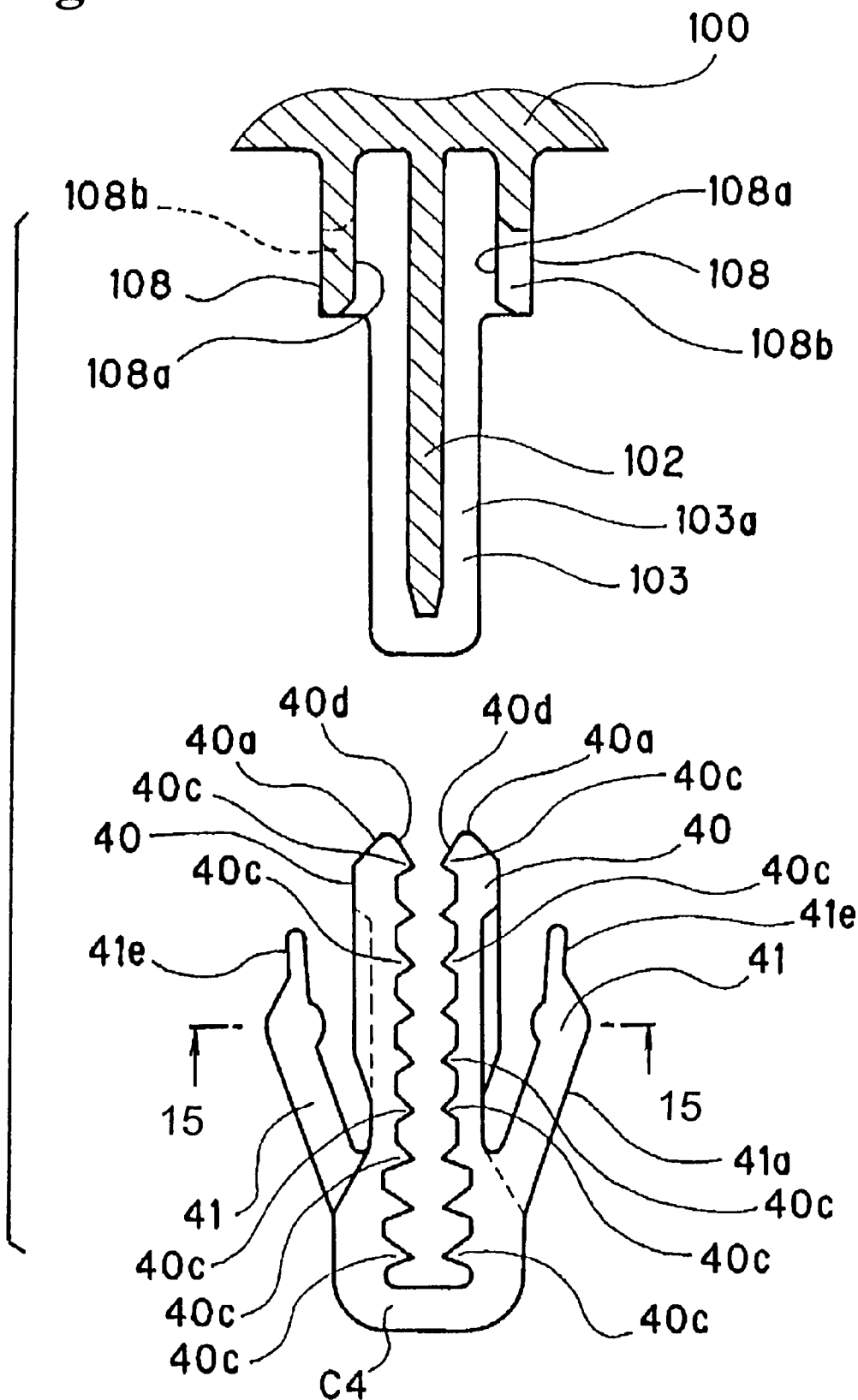
FIG. 12 is a side view separately showing the clip and the insertion part pertaining to the fourth embodiment.

Next, a clip C3 which is shown in FIG. 7 through FIG. 9 is explained.

Such clip C3 comprises a pair of clamping plates 30 that receives therebetween the receiving plate part 102, which constitutes the insertion part 101 provided on the object 100 being attached and is long in the direction of insertion of the insertion part 101, and coupling arms 31 provided outside this pair of clamping plates 30.

Such clamping plate 30 is connected integrally with the other clamping plate 30 by a connecting part 30b at the opposite side (below, called the base part side of the clamping plate 30) to the receiving side (below, called free end 30a side of the clamping plate 30) of the receiving plate part 102. Also, in this example, it is constituted such that the receiving plate part 102 can be inserted between the pair of clamping plates 30 up to the position where the tip of the receiving plate part 102 abuts against the inner surface of this connecting part 30b.

Also, in this example, such receiving plate part 102 is provided so as to cross between a pair of side plates 103 which arrange side walls 103a in a direction substantially orthogonally to the plate surface of the receiving plate part 102, and the insertion part 101 is formed by this receiving plate part 102 and the pair of side plates 103. Specifically, such side plates 103 also are constituted so as to be long in the direction of insertion of the insertion part 101. Also, the side plates 103 are constituted to be longer than the receiving plate part 102, and the tips of the side plates 103 are made to project in the forward direction of insertion more than the tip of the receiving plate part 102. Also, such receiving plate part 102 is provided substantially along the middle position in the width direction of the side plates 103, and it is constituted such that the space between the pair of side plates 103 is divided into left and right by the receiving plate part 102.

Also, in this example, a plurality of teeth 30c, the tips of which are pressed to the receiving plate part 102 of the object 100 being attached, is respectively provided on the mutually facing sides of the pair of clamping plates 30 (below, called the inner surface side of the clamping plates 30) so as to form a multiple stage pattern in the direction of insertion into the attachment hole 201.

Specifically, in this example, each teeth 30c is constituted as a rib-shaped body that is provided on the inner surface side of the clamping plate 30 and crosses in the width direction of the clamping plate 30. Also, between each tooth 30c, there is respectively formed an interval. Also, in this example, it is constituted such that the interval between the virtual surface on which the tips of the teeth 30c formed on one clamping plate 30 are positioned and the virtual surface on which the tips of the teeth 30c formed on the other clamping plate 30 are positioned becomes somewhat narrower than the plate thickness of the receiving plate part 102 which is inserted between such pair of clamping plates 30, and it is constituted such that each clamping plate 30 is made capable of elastic deformation in the direction of being separated from the other clamping plate 30 generally about on the base part side.

As a result, in this example, by inserting the receiving plate part 102 between the pair of clamping plates 30 from its free end 30a side, the receiving plate part 102 can be clamped by such pair of clamping plates 30 while the pair of clamping plates 30 is caused to elastically expand outward such that the plurality of teeth 30c respectively provided on the pair of clamping plates 30 is pressed against the plate surface of the receiving plate part 102 inserted in this manner, and the clip C3 can be fixed around the receiving plate part 102 by this clamping.

Also, because such plurality of teeth 30c is provided so as to form a multiple stage pattern across the direction of insertion of the insertion part 101 into the attachment hole 201, that is, the direction of insertion of the receiving plate part 102, the teeth can be pressed against the receiving plate part 102 by the springing force of the clamping plates 30 in a plurality of locations across the direction of insertion of the receiving plate part 102 from both sides of the receiving plate part 102. Thus, the state of fixing of the receiving plate part 102 between such pair of clamping plates 30 can be maintained with stability.

Also, because the springing or elastic forces of the clamping plates 30 act on the receiving plate part 102 at the tips of the plurality of teeth, the receiving plate part 102 can be clamped properly by the pair of clamping plates 30 even when there is some unevenness on the plate surfaces of such receiving plate part 102.

Also, the plurality of teeth 30c provided on the clamping plates 30 respectively is constituted such that the upper surfaces facing the free end 30a side are made to incline in the direction gradually approaching the base part from the root side to the tip side of the teeth 30c, such that the tip of the receiving plate part 102 easily rides past each tooth 30c by the inclination of this upper surface.

Also, in this example, on the outside of the pair of clamping plates 30, there are provided plate-shaped coupling arms 31 that have the same width as that of the clamping plate 30 and arrange plate surfaces in the same direction as the plate surfaces of the clamping plates 30.

Specifically, such coupling arm 31 is constituted such that one end thereof is integrally connected in a position near the free end 30*a* of the clamping plate 30, such that it can be elastically bent inward in the direction approaching the clamping plate 30 about this connected position. Also, in this example, such coupling arm 31 is formed to have a length such that its tip is positioned above the free end 30*a* of the clamping plate 30, and it respectively has a coupling bump 31*a* on the outside part.

Also, in this example, it is constituted such that the interval between the apexes 31*b* of the coupling bumps 31*a* of such pair of coupling arms 31 becomes greater than the hole width of the attachment hole 201 opened in the object receiving attachment 200.

As a result, in this example, by inserting the receiving plate part 102 between the pair of clamping plates 30 to attach the clip C3 to the insertion part 101 of the object 100 being attached, and then inserting this insertion part 101 into the attachment hole 201 of the object receiving attachment 200, the coupling bumps 31*a* of the coupling arms 31 abut against the hole edge part on the front side of insertion in the attachment hole 201 and the coupling arms 31 are once elastically bent inward, and then the coupling arms 31 return at the final position of insertion of this insertion part 101 into the attachment hole 201 and the coupling bumps 31*a* can be coupled to the hole edge part of the attachment hole 201 at the far ends of inserting the coupling arms 31. By this, the object 100 being attached can be attached to the object receiving attachment 200 via the clip C3 with one touch.

In this example, on the outer surface side of the coupling arm 31, there is formed an inclined surface 31*c* that inclines so as to gradually widen outward toward the apex 31*b* of the coupling bump 31*a* from the side of connection with the clamping plate 30 on this coupling arm 31. Thus, the coupling arm 31 can be bent inward smoothly by the inclined surface 31*c* abutting against the hole edge part on the front side of insertion in the attachment hole 201 pursuant to insertion of the insertion part 101 into the attachment hole 201.

Also, between such coupling bump 31*a* and the tip of coupling arm 31, there is formed a fitting surface 31*d* along the direction of insertion which is pressed against the inner surface of the attachment hole 201 at the final position of insertion.

Also, in this example, it is constituted such that the coupling bump 31*a* of the coupling arm 31 is coupled on the side of this fitting surface 31*d* to the hole edge part on the far end of insertion into the attachment hole 201.

Also, in this example, the clip C3 is provided with coupling parts 32 coupled to a part 106 provided on the insertion part 101 pursuant to receiving of the receiving plate 102, which constitutes the insertion part 101 of the object 100 being attached, between the pair of clamping plates 30.

In this example, the coupling parts 32 of such clip C3 are made as hooks 32*a* that once cause the pair of clamping plates 30 to expand outward by colliding with the side surface of the receiving plate part 102 pursuant to receiving of the receiving plate part, and enter into and are coupled to a hole 106*a* that serves as the coupled part 106 which is formed in the receiving plate part, by returning of the pair of clamping plates 30.

Specifically, in this example, the hooks 32 are provided respectively on the inner surface parts of the free end 30*a* sides of the pair of clamping plates 30. In this example, such hook 32*a* is constituted such that the size of projection from the clamping plate 30 is made greater than the plurality of teeth 30*c* provided on the clamping plate. Also, in this example, in order that the protruding tip 32*b* of the hook 32*a* provided on one side of such pair of clamping plates 30 and the hook 32*a* provided on the other side do not face each other, it is constituted such that the position of the hook 32*a* on one clamping plate 30 and the position of the hook 32*a* on the other clamping plate 30 are adjacent to each other when viewing the clip C3 as a plane from the free end 30*a* side of the clamping plate 30 (FIG. 9).

Also, in this example, it is constituted such that the hole 106*a* which serves as the coupled part 106 is opened through the receiving plate part, and the hooks 32*a* which serve as the coupling part 32 provided on the pair of clamping plates 30 corresponding to the hole 106*a* cause the clamping plates 30 to expand outward by respectively abutting against the tip of the receiving plate part 102 pursuant to receiving of the receiving plate part 102 between this pair of clamping plates 30. Then, the hooks 32*a* which serve as this coupling part 32 enter into the hole 106*a* and are respectively coupled by the return of the pair of clamping plates 30 at the position of the receiving plate part 102 where they enter the hole 106*a*.

As a result, in this example, when the object 100 being attached and the object receiving attachment 200 which once were attached together via the clip C3 are separated by pulling the side of the object 100 with a force great enough to pull out the insertion part 101 from the attachment hole, by the coupling of the hooks 32*a* which constitute the coupling part 32 provided on the side of the clip C3 and the hole 106*a* provided on the side of the insertion part 101, it can be made such that such clip C3 is pulled out from the attachment hole 201 together with the insertion part 101 in a state being fixed to the receiving plate part 102 which constitutes the insertion part 101, without being left on the side of the object receiving attachment 200, that is, in the attachment hole 201.

Also, in this example, the hooks 32*a*, which respectively are provided on the pair of clamping plates 30 and constitute the coupling part 32, are formed adjacent to each other when viewing the clip C3 as a plane from the free end 30*a* side of the clamping plate 30 as noted previously. Thus, the clip C3 can be formed without problem by injection molding, and the like, using a plastic material, in a state in which the protruding tip 32*b* of the hook 32*a* formed on one clamping plate 30 and the protruding tip 32*b* of the hook 32*a* formed on the other clamping plate 30 are made to form substantially the same surface when viewing the clip C3 from the side, and the surface area for coupling the hooks 32*a* to the hole 106*a* can be fully assured.

It also may be constituted such that the plurality of teeth 30*c* provided on the inner surface side of the clamping plates 30 further has elasticity.

In this case, the springing or elastic forces of such teeth 30*c* can act further on the receiving plate part 102 having been inserted between the pair of clamping plates 30, so that the state of fixing between the receiving plate part 102 and the clip C3 can be further improved.

Next, a clip C4 which is shown in FIG. 10 through FIG. 15 is explained.

Such clip C4 comprises a pair of clamping plates 40 that receives therebetween a receiving plate part 102, which constitutes the insertion part 101 provided on the object 100 being attached and is long in the direction of insertion of the insertion part 101, and coupling arms 41 provided outside the pair of clamping plates 40.

Such clamping plate 40 is connected integrally with the other clamping plate 40 by a connecting part 40b at the opposite side (below, called the base part side of the clamping plate 40) to the receiving side (below, called the free end 40a side of the clamping plate 40) of the receiving plate part 102. Also, in this example, it is constituted such that the receiving plate part 102 can be inserted between the pair of clamping plates 40 up to the position where the tip of the receiving plate part 102 abuts against the inner surface of this connecting part 40b.

Also, in this example, such receiving plate part 102 is provided so as to cross between a pair of side plates 103 which arranges side walls 103a in a direction substantially orthogonally to the plate surface of the receiving plate part 102, and the insertion part 101 is formed by this receiving plate part 102 and the pair of side plates 103. Specifically, such side plates 103 also are constituted so as to be long in the direction of insertion of the insertion part 101. Also, the side plates 103 are constituted to be longer than the receiving plate part 102, and the tips of the side plates 103 are made to extend in the forward direction of insertion more than the tip of the receiving plate part 102. Also, such receiving plate part 102 is provided substantially along the middle position in the width direction of the side plates 103, and it is constituted such that the space between the pair of side plates 103 is divided into left and right by the receiving plate part 102.

Also, in this example, a plurality of teeth 40c, the tips of which are pressed to the receiving plate part 102 of the object 100 being attached, is respectively provided on the mutually facing sides of the pair of clamping plates 40 (below, called the inner surface side of the clamping plates 40) so as to form a multiple stage pattern in the direction of insertion into the attachment hole 201.

Specifically, in this example, each tooth 40c is constituted as a rib-shaped body that is provided on the inner surface side of the clamping plate 40 and crosses in the width direction of the clamping plate 40. Also, between each tooth 40c, there is respectively formed an interval. Also, in this example, it is constituted such that the interval between the virtual surface on which the tips of the teeth 40c formed on one clamping plate 40 are positioned and the virtual surface on which the tips of the teeth 40c formed on the other clamping plate 40 are positioned becomes somewhat narrower than the plate thickness of the receiving plate part 102 which is inserted between such pair of clamping plates 40. Also, it is constituted such that each of such pair of clamping plates 40 is made capable of elastic deformation in the direction of being separated from the other clamping plate 40 generally about the base part side.

As a result, in this example, by inserting the receiving plate part 102 between the pair of clamping plates 40 from its free end 40a side, the receiving plate part 102 can be clamped by such pair of clamping plates 40 while the pair of clamping plates 40 is caused to elastically expand outward such that the plurality of teeth 40c respectively provided on the pair of clamping plates 40 is pressed against the plate surfaces of the receiving plate part 102 inserted in this manner, and the clip C4 can be fixed around the receiving plate part 102 by this clamping.

Also, because such plurality of teeth 40c is provided so as to form a multiple stage pattern across the direction of insertion of the insertion part 101 into the attachment hole 201, that is, the direction of entry of the receiving plate part 102, the teeth 40c can be pressed against the receiving plate part 102 by the springing or elastic force of the clamping plates 40 in a plurality of locations across the direction of pushing of the receiving plate part 102 from both sides of the receiving plate part 102. Thus, the state of fixing of the receiving plate part 102 between such pair of clamping plates 40 can be maintained with stability.

Also, because the springing force of the clamping plates 40 acts on the receiving plate part 102 at the tips of the plurality of teeth 40c, the receiving plate part 102 can be clamped properly by the pair of clamping plates 40, even when there is some unevenness on the plate surfaces of such receiving plate part 102.

In this example, on the inner surface side of the clamping plates 40 in a location from the free end 40a to the tooth 40c in the position nearest to this free end 40a, there is formed an inclined surface 40d that inclines in a direction gradually separated from the inner surface of the other clamping plate 40 when going toward the free end 40a, and it is made such that the insertion of the receiving plate part 102 between such pair of clamping plates 40 from the free end 40a side can be performed smoothly by guiding the tips of the receiving plate part 102 with the inclined surfaces 40d.

Figure 13:
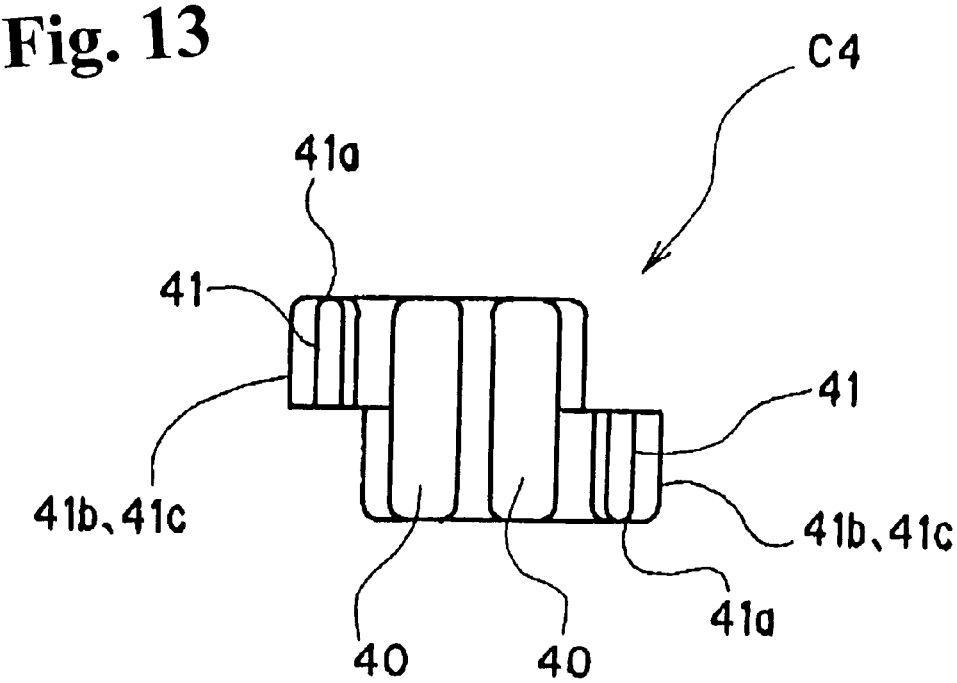
FIG. 13 is a plan view of the clip.
Figure 14:
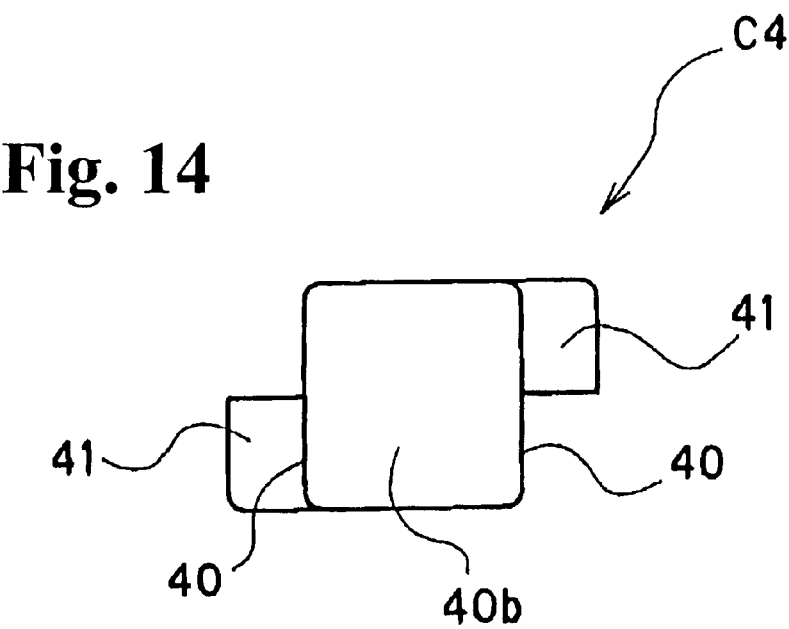
FIG. 14 is a bottom view of the clip.
Figure 15:
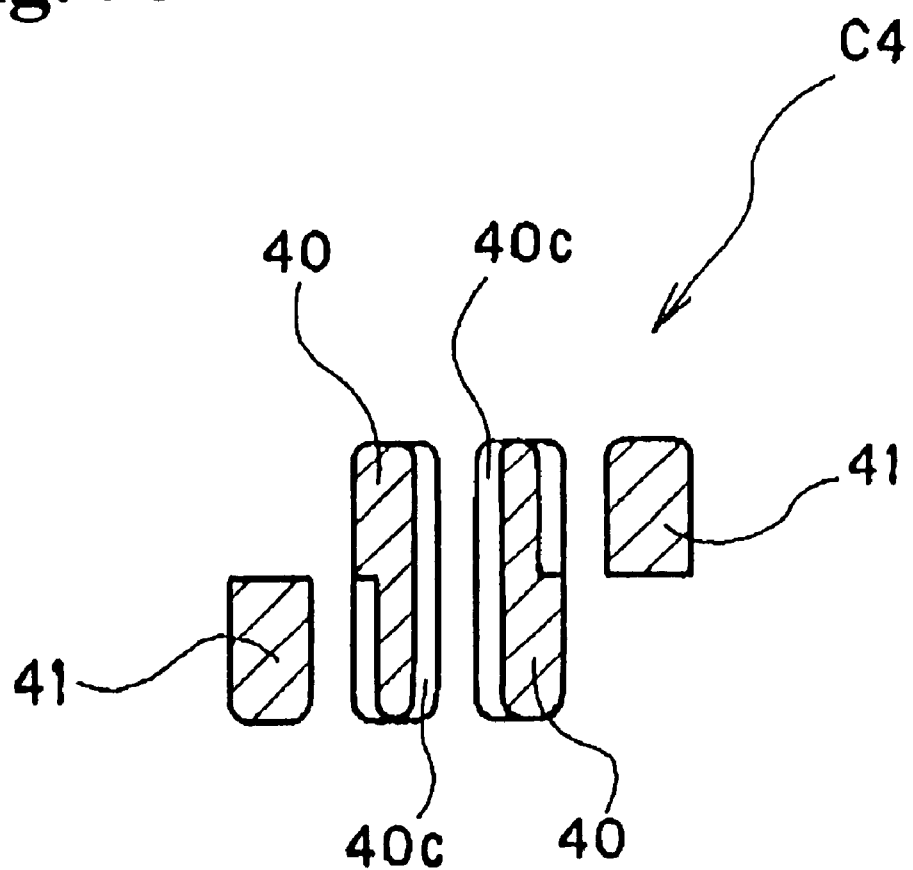
FIG. 15 is a sectional view taken along line 15—15 in FIG. 12.
Figure 16:
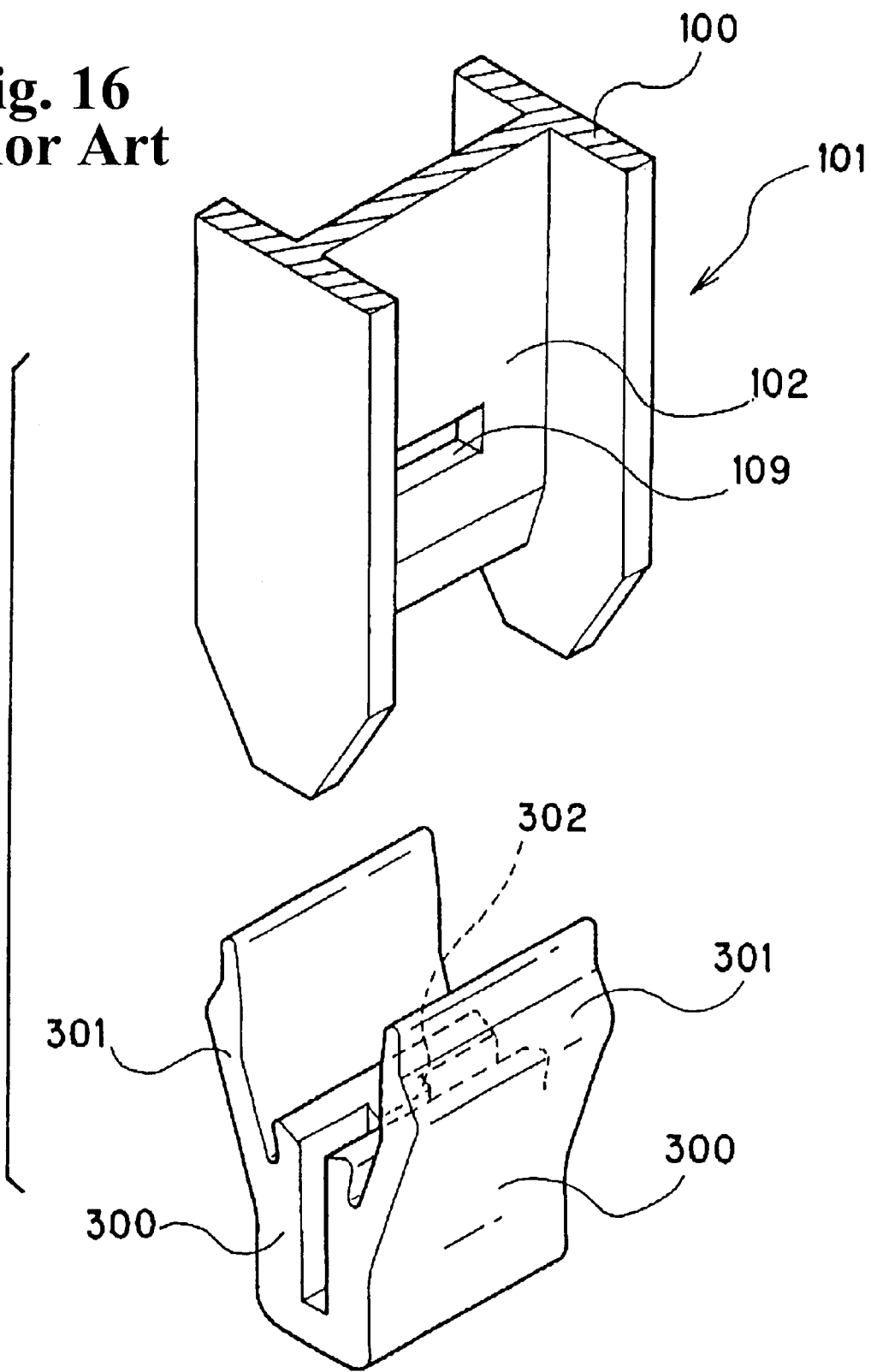
FIG. 16 is a perspective view showing an example of the prior art.
Figure 17:
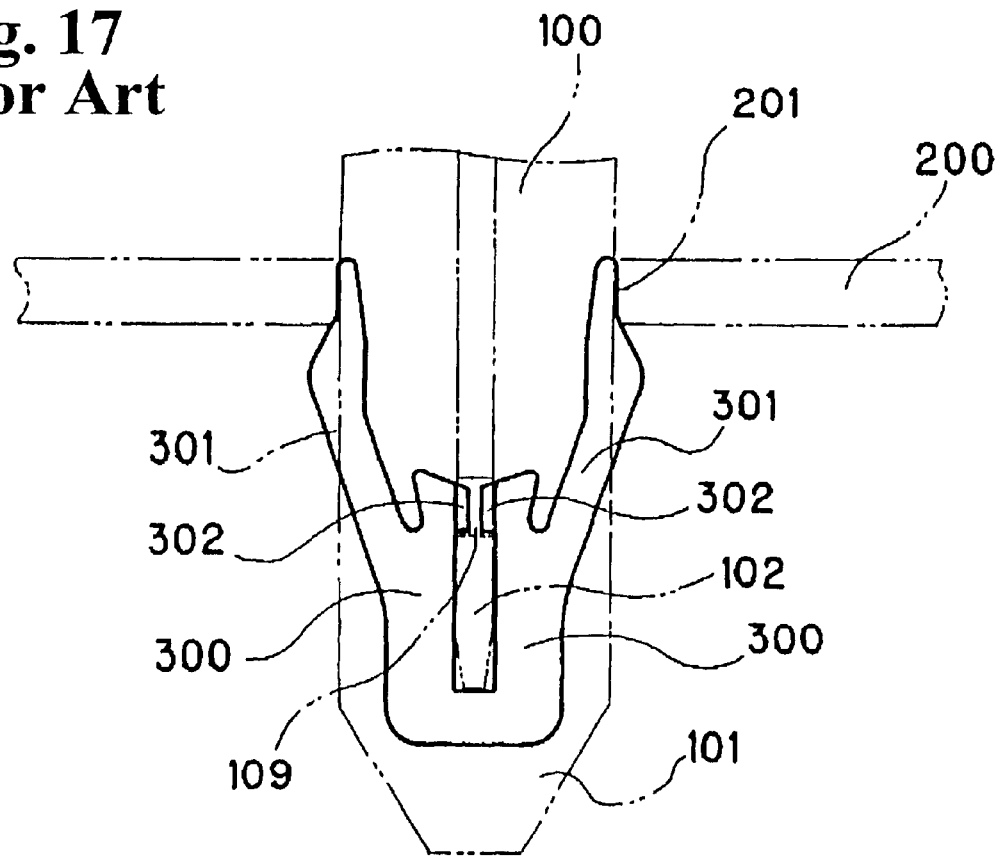
FIG. 17 is a side view showing the state of use of the prior art example.
Figure 18:
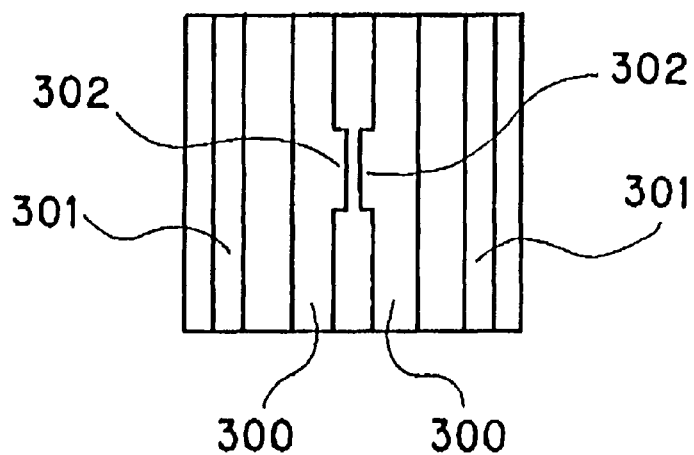
FIG. 18 is a plan view of the prior art example.

Also, in this example, on the outside of each clamping plate 40, there is provided a plate-shaped coupling arm 41 that has an inner surface facing the outer surface of the clamping plate 40 and has about half the width of the clamping plate 40. Also, one side edge 41a in the length direction of the coupling arm 41 provided on one side of the pair of clamping plates 40 is made to extend along one side edge in the length direction of the clamping plate 40 on one side, and one side edge 41a in the length direction of the coupling arm 41 provided on the other side of the pair of clamping plates 40 is made to extend along the other side edge in the length direction of the clamping plate 40 on the other side. That is, in this example, it is constituted such that, when the clip C4 is viewed as a plane from the free end 40a side of the clamping plates 40, the coupling arm 41 on the side of one clamping plate 40 and the coupling arm 41 on the side of the other clamping plate 40 are arranged in point-symmetric positions based on the center part (the center of the connecting part 40b) of the clip C4 (FIG. 13).

Specifically, such coupling arm 41 is constituted such that one end thereof is integrally connected in a position near the connecting part 40b of the clamping plate 40, such that it can be elastically bent inward in the direction approaching the clamping plate 40 about this connected position. Also, in this example, such coupling arm 41 is formed to a length such that its tip is positioned below the free end 40a of the clamping plate 40, and it respectively has a coupling bump 41b on the outside part.

Also, in this example, it is constituted such that the interval between the apexes 41c of the coupling bumps 41b of such pair of coupling arms 41 becomes greater than the hole width of the attachment hole 201 opened in the object receiving attachment 200.

As a result, in this example, by inserting the receiving plate part 102 between the pair of clamping plates 40 to thereby attach the attaching clip C4 to the insertion part 101 of the object being attached, and then inserting this insertion part 101 into attachment hole 201 of the object receiving attachment 200, the coupling bumps 41b of the coupling arms 41 abut against the hole edge part on the front side of insertion in the attachment hole 201. The coupling arms 41 are once elastically bent inward, and then the coupling arms 41 are caused to return at the final position of insertion of this insertion part 101 into the attachment hole 201, so that the coupling bumps 41b can be coupled to the hole edge part of the attachment hole 201 at the far end of insertion of the coupling arms 41. By this, the object 100 being attached can be attached to the object receiving attachment 200 via the clip C4 with one touch.

In this example, on the outer surface side of the coupling arm 41, there is formed an inclined surface 41d that inclines so as to gradually widen or expand outward toward the apex 41c of the coupling bump 41b from the side of connection with the clamping plate 40 on this coupling arm 41. Thus, the coupling arm 41 can be bent inward smoothly by the inclined surface 41d upon abutment against the hole edge part on the front side of insertion in the attachment hole 201 pursuant to insertion of the insertion part 101 into the attachment hole 201.

Also, between such coupling bump 41b and the tip of the coupling arm 41, there is formed a fitting surface 41e along the direction of insertion which is pressed against the inner surface of the attachment hole 201 at the final position of insertion.

Also, in this example, it is constituted such that the coupling bump 41b of the coupling arm 41 is coupled on the side of this fitting surface 41e to the hole edge part on the far end of insertion into the attachment hole 201.

It also may be constituted such that the plurality of teeth 40c provided on the inner surface side of the clamping plates 40 further has elasticity.

In this case, the springing force of such teeth 40c can act further on the receiving plate part 102 having been inserted between the pair of clamping plates 40, and the state of fixing between the receiving plate part 102 and the clip C4 can be further improved.

Also, in this example, it is constituted such that the free ends 40a of the pair of clamping plates 40 having received the receiving plate part 102 which constitutes the insertion part 101 are positioned between a pair of checking walls 108a provided on the side of the protruding base part of the insertion part 101 of the object 100 being attached, such that the outward expansion is checked or prevented by the abutment thereto when force in the direction of pulling out the insertion part 101 from the attachment hole 201 of the object receiving attachment 200 is applied.

More specifically, in this example, on each side of the receiving plate part 102 which constitutes the insertion part 101 of the object receiving attachment 100, there is formed a checking bump 108 having a checking wall 108a facing the plate surface of this receiving plate part 102 so as to cross between the bases of the pair of side plates 103. In addition to that, it is constituted such that the interval between the outside parts of the free ends 40a of the pair of clamping plates 40 having received such receiving plate 102 in between is somewhat smaller than the interval between the pair of checking walls 108a. Also, such pair of clamping plates 40 respectively positions the free ends 40a inside the checking bumps 108a at the final position of insertion of the receiving plate part 102 where the tip of the receiving plate part 102 abuts against the inner surface of connecting part 40b between this pair of clamping plates 40.

As a result, in this example, when the object 100 being attached and object receiving attachment 200 which once were attached together via the clip C4 are separated by pulling the side of the object 100 with a force great enough to pull out the insertion part 101 from the attachment hole 201, outward expansion of the pair of clamping plates 40 which receive forces for bending outward by the receiving plate part 102 which is moved in this direction of pulling out can be checked or prevented by pressing the free end 40a of the clamping plates 40 against the checking walls 108a. By this, it can be made such that such clip C4 is pulled out from the attachment hole 201 together with the insertion part 101 in a state being fixed to the receiving plate part 102 which is a constituent of the insertion part 101 without being left on the side of the object receiving attachment 200, that is, in the attachment hole 201.

In this example, it is constituted such that the checking bump 108, which is a constituent of the insertion part 101, also enters into the attachment hole 201 at the final position of insertion of the insertion part 101 of the object 100 into the attachment hole 201.

In addition to that, in this example, when the clip C4 is viewed as a plane from the free end 40a side of the clamping plates 40, the coupling arm 41 provided on the side of one of the pair of clamping plates 40 and the coupling arm 41 provided on the other side are arranged in point-symmetric positions. Thus, a cut-out part 108b that allows a movement of the tip of the coupling arm 41 is provided on the checking bump 8 at a place where it enters into the attachment hole 201. The positions of these cut-out parts 108b also are made different between the side of one checking bump 108 and the side of the other checking bump 108.

By such clip in this invention, the clamping force can act properly on the receiving plate part, which is a constituent of the insertion part provided on the object being attached, in all locations across the direction of insertion of the insertion part, even when there is unevenness, and the like, on the plate surfaces of the receiving plate part, by a plurality of teeth which is provided so as to respectively form multiple stage pattern on the mutually facing sides of the pair of clamping plates.

Also, by the clips of the invention, during removal of the object being attached, in which the insertion part is pulled out from the attachment hole of the object receiving attachment, it becomes possible to assuredly pull out the clip from the attachment hole together with the insertion part, even without applying special processing to the side of the insertion part of the object being attached.

While the invention has been explained with reference to the specific embodiments of the invention, the explanation is illustrative and the invention is limited only by the appended claims.

What is claimed is:

1. A clip to be attached to an insertion part of an object and inserted into an attachment hole formed in an object receiving attachment, comprising:

a pair of clamping plates facing each other for receiving therebetween the insertion part of the object and having elasticity for expanding outward, said clamping plates having inner surfaces and a plurality of teeth with tips formed on the inner surfaces, said tips forming a multiple stage pattern across a direction of insertion of the object into the attachment hole to be pressed to the insertion part, and coupling arms provided outside the clamping plates, said coupling arms being coupled to the attachment hole by elasticity at a final position of insertion into the attachment hole after being elastically bent inward pursuant to insertion of the insertion part of the object into the attachment hole.

2. A clip according to claim 1, wherein the teeth provided on the clamping plates have elasticity.

3. A clip according to claim 1, wherein said clamping plates have free end parts pressed inward from the coupling arms, which are pressed against a hole edge part of the attachment hole and are bent inward when a force in a direction of pulling out the insertion part from the attachment hole of the object receiving attachment is applied.

4. A clip according to claim 1, wherein said teeth formed on one side of the clamping plate are spaced apart from each other in a direction of the insertion of the insertion part and extends in a direction perpendicularly to the direction of the insertion of the insertion part, respectively, said teeth formed on one side of the clamping plate facing the teeth formed on the other side of the clamping plate.

5. A combination of a clip and an insertion section for receiving the clip, said clip with the insertion section being inserted into an attachment hole formed in an object receiving attachment, said insertion section comprising:

a base, an insertion part extending from the base, and an engaging part formed on the insertion part, said clip comprising:

a pair of clamping plates facing each other for receiving therebetween the insertion part and having elasticity for expanding outward, said clamping plates having free end parts, inner surfaces and a plurality of teeth with tips formed on the inner surfaces, said tips forming a multiple stage pattern across a direction of insertion into the attachment hole to be pressed to the insertion part, and coupling arms provided outside the clamping plates, said coupling arms being coupled into the attachment hole by elasticity at a final position of insertion of the insertion section into the attachment hole after being elastically bent inward pursuant to insertion of the insertion part into the attachment hole.

6. A combination according to claim 5, wherein said engaging part includes a pair of checking walls attached to the base to sandwich the insertion part therebetween, said free end parts of the clamping plates with the insertion part therebetween being positioned inside the checking walls such that outward expansions of the clamping plates are prevented when a force in a direction of pulling out the insertion part from the attachment hole of the object receiving attachment is applied.

7. A combination according to claim 5, wherein said clip includes a coupling part, and said engaging part includes a coupled part provided on the insertion part and engaging the coupling part upon receiving the insertion part between the clamping plates.

8. A combination according to claim 7, wherein said coupled part is bumps formed on a receiving plate of the insertion part, and the coupling part is hooks for urging the clamping plates to expand outward by abutting against the bumps pursuant to receiving of the receiving plate, said hooks being coupled to the bumps by riding past the bumps due to expansion of the clamping plates and returning back to the clamping plates at the position rode past.

9. A combination according to claim 7, wherein said coupled part is a hole formed in a receiving plate of the insertion part, and the coupling part is hooks formed on the clamping plates, said hooks urging the clamping plates to expand outward by abutting against the receiving plate pursuant to receiving of the receiving plate and engaging the hole by elasticity of the clamping plates.

10. A combination according to claim 7, wherein said insertion part includes side walls formed on lateral sides of the insertion part, said side walls having bumps as the coupled part, and the coupling part is elastic projections formed on lateral sides of the clamping plates, said elastic projections being elastically deformed when abutting against the bumps upon receiving of the insertion part between the clamping plates, riding past the bumps and being coupled to the bumps by elasticity.

11. A combination according to claim 10, wherein said elastic projections are formed of at least two pairs of projections spaced part from each other, each one pair being at least formed on one side of the clip.

* * * * *